United States Patent
Davis

(10) Patent No.: US 10,728,662 B2
(45) Date of Patent: Jul. 28, 2020

(54) AUDIO MIXING FOR DISTRIBUTED AUDIO SENSORS

(71) Applicant: Nokia Technologies Oy, Espoo (FI)

(72) Inventor: Ian Davis, Dublin (IE)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/259,169

(22) Filed: Jan. 28, 2019

(65) Prior Publication Data

US 2020/0177994 A1 Jun. 4, 2020

Related U.S. Application Data

(60) Provisional application No. 62/772,819, filed on Nov. 29, 2018.

(51) Int. Cl.
*H04R 3/04* (2006.01)
*G10L 21/0208* (2013.01)
*G10L 25/60* (2013.01)

(52) U.S. Cl.
CPC ............ *H04R 3/04* (2013.01); *G10L 21/0208* (2013.01); *G10L 25/60* (2013.01)

(58) Field of Classification Search
CPC ........ H04R 3/04; G10L 21/0208; G10L 25/60
See application file for complete search history.

(56) References Cited

U.S. PATENT DOCUMENTS

| | | |
|---|---|---|
| 5,848,146 A | 12/1998 | Slattery |
| 9,736,611 B2 | 8/2017 | Hetherington et al. |
| 2017/0245053 A1* | 8/2017 | Virolainen ............ G10L 19/008 |
| 2018/0115852 A1* | 4/2018 | Kitazawa ............... H04R 3/005 |
| 2018/0160225 A1 | 6/2018 | Virolainen et al. |

FOREIGN PATENT DOCUMENTS

| | | |
|---|---|---|
| CN | 108287928 | * 7/2018 |
| WO | WO 2017/005981 A1 | 1/2017 |
| WO | WO 2017/220854 A1 | 12/2017 |

OTHER PUBLICATIONS

Bertrand, A. et al., *Distributed Adaptive Estimation of Node-Specific Signals in Wireless Sensor Networks With a Tree Topology*, IEEE Transactions on Signal Processing, vol. 59, No. 5 (May 2011) 2196-2210.

Johansson, D., *Automatic Microphone Mixing for a Daisy Chain Connected Multi-Microphone Speakerphone Setup*, Master's Thesis, UMEA University (Jun. 2016) 59 pages.

* cited by examiner

*Primary Examiner* — Regina N Holder
(74) *Attorney, Agent, or Firm* — Alston & Bird LLP

(57) ABSTRACT

A method, apparatus and computer program product enhance audio quality during a voice communication session, enhancing audio quality for a device of a remote user. The apparatus can comprise a processor, a memory, and a computer program code, and can be configured to receive and weight audio signals based on signal attributes such that audio signals can be adjusted and adjusted signals mixed to form a composite audio signal. In a method, a processor receives audio signals from audio sensors around a room, selects one or more audio signals based on audio signal attributes, and adjusts or causes the adjustment of the one or more audio signals based on the audio signal attributes. The method can also include causing the adjusted audio signals to be mixed to form a composite signal, and causing the composite signal to be communicated to a device of a remote user.

30 Claims, 5 Drawing Sheets

AUDIO MIXING FOR DISTRIBUTED AUDIO SENSORS

CROSS-REFERENCE TO RELATED APPLICATIONS

This application claims priority to and the benefit of U.S. Provisional Patent Application No. 62/772,819, entitled "Audio Mixing for Distributed Audio Sensors" filed Nov. 29, 2018, the entire disclosure of which is hereby incorporated herein in its entirety for all purposes.

TECHNICAL FIELD

An example embodiment relates generally to a method, apparatus and computer program product for selecting audio signals from one or more of a set of distributed audio sensors and, more particularly, to a method, apparatus and computer program product for causing the adjustment of audio signals based on audio signal attributes.

BACKGROUND

Many meeting or event spaces, such as in smart buildings, are instrumented with technology that enables smart energy management, wireless networking, and autonomous systems, among other things. Instrumentation of these spaces can often take the form of internet connected devices (Internet-of-Things devices, TOT devices). TOT devices can monitor room characteristics such as temperature or humidity, can monitor WiFi strength and internet connectivity, can monitor sound levels such as at a music venue, and for a wide variety of other purposes. Many commercial spaces such as conference rooms in an office building already receive or could shortly receive 5G coverage from a network of distributed small cells, increasing bandwidth and low latency and enabling the use of even more instrumentation such as TOT devices in such spaces.

Point-to-point communication. e.g., voice communication, is widely used for a variety of applications, and is often carried out in commercial spaces such as conference rooms office buildings. In such systems, a presenter, speaker, or other such source of audio signal is positioned at a location or a plurality of locations within a conference room. The conference room can have a central microphone or other such audio sensor that captures, to varying degrees of quality, audio signals from the audio source. The microphone can be connected, coupled, operably coupled, or otherwise configured to transmit audio signal to a processor. The processor can receive the audio signal and communicate it to a device of a remote user, viewer, or other such participant of the point-to-point communication. For example, the ubiquity of internet-based communication platforms, such as Webex, Google Hangouts, and Skype, has enabled remote user devices to join meetings from any global location. However, remote users still suffer from a loss of immersion in comparison to the experience of attending a meeting in person. Typically, the remote user joins the meeting using a speakerphone and/or a laptop computer, and their voice is relayed into the meeting room using a single speaker. If two-way video communication is enabled, only a single viewpoint is generally available for the remote user from a single fixed camera, and the audio is not spatially linked to this visual viewpoint. In addition, statically positioned microphones often cannot capture audio from the audio source that is optimized with regard to a variety of characteristics or attributes, such as feedback, tininess, echo, This configuration results in a sub-optimal experience in which the remote user has a detached presence, and the illusion that they are "in the room" is rarely maintained.

Audio quality is of import in relation to the user experience in conjunction with voice communication. Poor quality audio undermines any attempts at effective communication. Furthermore, full immersion by the remote user can only be attained if the audio viewpoint matches the video.

Traditional methods of obtaining audio from a single location within a meeting room, which is then sent to the remote user(s), employ a single microphone (monaural) or two-microphone (stereo) mix from microphones onboard a single device. However, the efficacy of this approach is limited. If the audio source is nearer/farther from the active microphone(s), the sound levels will change and the audio source could be too loud or too quiet. While this change in sound levels could be overcome with auto-gain levelling schemes, the presence of other interfering audio or noise sources will cause these schemes to fail. Thus, the audio quality of many voice communication sessions, such as the audio quality provided to remote user in a meeting, is less than desired which, in turn, diminishes the overall user experience.

Therefore, there is a long-felt need in the industry for an apparatus, method, and computer program code associated with combining/mixing distributed audio in such a way that audio quality is enhanced in a manner that is both computationally inexpensive and does not require large bandwidth, while being robust when used in a variety of installation environments.

BRIEF SUMMARY

A method, apparatus and computer program product are provided for enhancing audio quality during a point-to-point communication session, e.g., a voice communication session, such as by enhancing the audio quality for a remote user in a meeting. In order to enhance the audio quality, the method, apparatus and computer program product of an example embodiment provide one or more audio signals from one or more audio sensors, e.g., omni-directional microphones, directionally tunable microphones, etc., that can be evaluated on the basis of audio signal attributes, e.g., signal-to-noise ratio or the like, and that can be mixed to form a composite signal having enhanced audio quality. In some embodiments, the method, apparatus and computer program product can provide one or more audio signal attributes for a plurality of audio signals from a plurality of distributed audio sensors such that audio signals can be adjusted based on a weighting value related to one or more of the audio signal attributes. In some embodiments, the method, apparatus and computer program product of an example embodiment also provide audio source positioning within a space, e.g., an inner space of a building such as a conference room or auditorium, by subdividing the space into a tessellation of cells, calculating the location or approximate location of the audio source within the space, and calculating a distance of the audio source to a boundary between cells of the tessellation. In some embodiments, the method, apparatus and computer program product of an example embodiment also provide spatial localization in order to enhance the relative strength or audio signal quality of an audio source at a target location, such as a particular participant in the meeting who is speaking, while reducing the relative strength of other audio sources and/or ambient noise originating or entering in the space. The method, apparatus and computer program product of an example embodiment also provide a multi-channel audio output signals from audio signals captured by multiple microphones in order to provide a more fully immersive experience for the remote user.

In an example embodiment, a method is provided for choosing a subset of a plurality of audio signals based on an audio signal attribute threshold value or range. The method can include receiving, at a processor, the plurality of audio signals captured by a plurality of audio sensors spatially distributed throughout the space. The method can optionally include synchronizing the plurality of audio signals. For instance, the method can optionally include temporally synchronizing or causing the temporal synchronization of the plurality of audio signals based on a clock. The method can further include selecting one or more audio signals from among the plurality of audio signals based upon a threshold value of one or more audio signal attributes of the plurality of audio signals. The method can further include causing an adjustment of the one or more audio signals based upon one or more weighting values. In some embodiments, the one or more weighting values for the one or more audio signals can be based upon the one or more audio signal attributes relative to one or more other audio signals from among the plurality of audio signals. The method can further include, following the adjustment of the one or more audio signals, causing the one or more audio signals from among the plurality of audio signals to be mixed to form an output audio signal that comprises the. The method can further include causing the output audio signal to be communicated to a device of a remote user.

According to some embodiments of the method, receiving can be receiving, during a first time period, and the method can further include transmitting or causing transmission of the one or more weighting values for the one or more audio signals to one or more of a plurality of remote processors. In some embodiments, the plurality of remote processors can be associated with the one or more of the plurality of audio devices, e.g., omni-directional microphones, directionally tunable microphones, or the like. In some embodiments, the one or more audio signals can be adjusted by the one or more of the plurality of remote processors according to the one or more weighting values for the one or more audio signals. The method can further include receiving, during a second time period, the adjusted one or more audio signals.

In some embodiments of the method described herein, the one or more audio signal attributes can include, but is not limited to, a signal-to-noise ratio, a signal-to-interference ratio, an amplitude, a phase, a frequency, a bandwidth, a nominal level, a voltage level, or a power level. Therefore, the weighting values can be normalized according to, correlated with, rank ordered according to, or otherwise related to the one or more audio signal attributes, such as those described herein. For example, in some embodiments, the one or more weighting values for the one or more audio signals can be correlated to at least the signal-to-noise ratio of the one or more audio signals.

In some embodiments, one or more other audio signals not selected from among the plurality of audio signals can comprise non-contributing signals and the plurality of audio signals can be received by the processor from a plurality of remote processors. In some embodiments, the method can further comprise causing transmission of, after a first time period, a discontinuation signal to one or more of the plurality of remote processors associated with the non-contributing signals, the discontinuation signal indicative of a command for the one or more of the plurality of remote processors to discontinue transmitting or discontinue causing transmission of audio signals to the processor for a predetermined time.

In some embodiments of the method described herein, the threshold value of the one or more audio signal attributes of the plurality of audio signals can comprise, include, or be a dynamic threshold value based upon one or more audio signal attribute ranges for the plurality of audio signals. The dynamic threshold value or values can be calculated for the one or more audio signal attributes of the plurality of audio signals using at least one processor and at least one memory including computer program code. In some embodiments, the dynamic threshold value or values for the one or more audio signal attributes of the plurality of audio signals can be calculated by generating the one or more audio signal attribute ranges for the one or more audio signal attributes from a minimum audio signal attribute value to a maximum audio signal attribute value for the plurality of audio signals, and identifying, based upon a predetermined user preference for minimizing or maximizing the one or more audio signal attributes, a lower subsection or an upper subsection, respectively, associated with the one or more audio signal ranges.

According to some embodiments, a method for enhancing the audio quality for a point-to-point communication can provide an approach for digitally steering the signals from the plurality of audio sensors distributed about a space. In some embodiments, a tessellation and cell expansion approach can be used to determine the location or approximate location of an audio source in the space. A computational method can be employed, such as a beamforming algorithm, that enhances the relative strength of noise-source(s) at a given location, and reduces the relative strength of other noise-sources in the environment. In some embodiments, if it is desirable for a remote user to listen to specific talker inside a meeting room, multiple microphones could be steered to the talker location and enhance the clarity of the talker. By scanning across an area, beamformers can also identify the location of a noise-source with certain characteristics (e.g. the loudest source), and therefore find a talker inside the room. Finally, beamformers also have the additional benefit of reducing the levels of room reverberation when compared with the individual microphone signals, which can improve speech intelligibility. In some embodiments, for example when paired with audio sensors, such as omni-directional microphones or directionally tunable microphones or other such audio sensor devices, the array of distributed audio sensors can be used to map the audio environmental in the space, reduce or eliminate reverberation and ambient noise, and select a subset of the microphones to be mixed together to achieve composite audio having enhanced sound quality.

The method of an example embodiment produces the filtered audio signal by filtering an audio signal received from the respective microphone based upon the target audio signal, such as by utilizing an adaptive cancellation algorithm in order to separate a contribution of the target audio source from the second audio source. The method of another example embodiment produces the filtered audio signal by filtering the target audio signal based upon expected transmission characteristics of audio signals from the target audio source to the respective microphone. The method of an example embodiment generates the target audio signal by applying beamforming to audio signals received by a plurality of microphones in the same environment as the target audio source including the one or more microphones of the second device in order to steer the target audio signal in the direction of the target audio source. The method of another example embodiment generates the target audio signal by receiving the target audio signal from an ambisonic microphone in the same environment as the target audio source that has been steered in the direction of the target audio source.

In an embodiment in which audio signals, including but not limited to from a remote user, are output from the speaker located in the same environment as the target audio source, the method may also include applying echo cancellation to the target audio signal prior to producing the filtered audio signal in order to reduce a contribution from the audio signals output by the speaker to the filtered audio signal. The method of an example embodiment also includes estimating a location of each of a plurality of microphones located in the same environment as the target audio source including the one or more microphones of the first device by analyzing a time-of-arrival of a mechanical pressure wave captured by each of the plurality of microphones in response to a mechanical pressure wave output by a source. The method of another example embodiment also includes estimating a location of each of a plurality of microphones located in the same environment as the target audio source including the one or more microphones of the first device by analyzing an image of the plurality of microphones. The method of yet another example embodiment includes determining or estimating a location of each of a plurality of microphones located in the same environment as the target audio source including the one or more microphones of the first device by receiving a signal from each of the plurality of microphones indicative of the location of each of the plurality of microphones within the environment.

In another embodiment, an apparatus is provided for providing or causing the provision of an audio signal having enhanced quality characteristics to a device of a remote user. The apparatus includes at least one processor and at least one memory including computer program code that is configured to, with the at least one processor, cause the apparatus, to at least receive a plurality of audio signals from a plurality of audio sensors, e.g., omni-directional microphones, directionally tunable microphones, or the like, spatially distributed throughout a space. The apparatus or components thereof can be configured to, optionally, synchronize the plurality of audio signals, e.g., temporally with respect to a clock. The apparatus can be further configured to select one or more audio signals from among the plurality of audio signals based upon a threshold value of one or more audio signal attributes of the plurality of audio signals. In some embodiments, the one or more audio signal attributes can comprise a signal-to-noise ratio, a signal-to-interference ratio, an amplitude, a phase a frequency, a bandwidth, a nominal level, a voltage level, or a power level. The apparatus or components thereof can be further configured to cause the adjustment of the one or more audio signals based upon one or more weighting values, the one or more weighting values for the one or more audio signals being based upon the one or more audio signal attributes relative to the one or more audio signals. In some embodiments, the apparatus or components thereof can be configured to directly adjust the one or more audio signals based upon the one or more weighting values. In some embodiments, the apparatus of components thereof can be configured to cause a separate device, such as a second at least one processor and a second at least one memory, to adjust the one or more audio signals. The apparatus or components thereof can optionally be further configured to, following the adjustment of the one or more audio signals, cause the mixing of the one or more audio signals from among the plurality of audio signals to form an output audio signal. The apparatus or components thereof can optionally be further configured to cause the output audio signal to be communicated to a device of a remote user.

In some embodiments, the apparatus or components thereof can be configured to receive the plurality of audio signals from the plurality of audio sensors, e.g., omni-directional microphones, directionally tunable microphones, or the like, during a first time period. In some embodiments, the apparatus can be further configured to transmit the one or more weighting values for the one or more audio signals to one or more of a plurality of remote processors associated with the one or more of the plurality of audio sensors such that the one or more audio signals is adjusted by the one or more of the plurality of remote processors according to the one or more weighting value for the one or more audio signals. In some embodiments, the apparatus or components thereof can be configured to receive, during a second time period, the adjusted one or more audio signals.

In some embodiments, the threshold value of the one or more audio signal attributes of the plurality of audio signals can be a dynamic threshold value based upon the range of attribute values for the plurality of audio signals. In some embodiments, the apparatus or components thereof can be further configured to calculate the dynamic threshold value for the one or more audio signal attributes of the plurality of audio signals. In some embodiments, the apparatus or components thereof can be configured to calculate the dynamic threshold value by generating an audio signal attribute value range from a minimum audio signal attribute value to a maximum audio signal attribute value for the plurality of audio signals and identifying, based upon a predetermined user preference for minimizing or maximizing the one or more audio signal attributes, a lower subsection of the range of attribute values or an upper subsection of the range of attribute values, respectively, associated with the one or more audio signals selected from the plurality of audio signals.

In some embodiments, a composite audio signal having enhanced signal attributes related to the quality of the audio source (also called a target audio source or a talker herein), can be generated at least from audio signals captured by the one or more audio sensors that have been steered in a direction of the target audio source in order to provide at least partial isolation from unwanted audio sources or ambient noise sources in the same environment as the target audio source. The filtered audio signal can be produced based on the target audio source at least from a respective one of the one or more audio sensors. The filtered audio signal can be produced so as to be based on the target audio signal that is steered in the direction of the target audio source, to deemphasize the second audio source and to reduce a contribution from audio signals output by a speaker located in the same environment as the target audio source. The at least one memory and the computer program code are also be configured to, with the processor, cause the apparatus to mix the filtered audio signals to create an audio output signal associated with an audio playback format and cause the audio output signal to be output, communicated, transmitted, or otherwise delivered to a device of a remote user in accordance with the audio playback format.

The at least one memory and the computer program code are configured to, with the processor, cause the apparatus of an example embodiment to produce the filtered audio signal and/or the composite audio signal by filtering an audio signal received from the respective audio sensors based upon the target audio source, such as by utilizing an adaptive cancellation algorithm in order to separate a contribution of the target audio source from unwanted audio sources and/or ambient noise in the same environment. The at least one memory and the computer program code can be configured to, with the processor, cause the apparatus of another example embodiment, produce the filtered audio signal by filtering the target audio signal based upon expected transmission characteristics of audio signals from the target audio source to the respective audio sensor. The at least one memory and the computer program code can be configured to, with the processor, cause the apparatus of an example embodiment to generate the target audio signal by applying beamforming to audio signals received by a plurality of microphones in the same environment as the target audio source including the one or more microphones of the first device in order to steer the target audio signal in the direction of the target audio source. The at least one memory and the computer program code are configured to, with the processor, cause the apparatus of another example embodiment to generate the reference audio signal by receiving the target audio signal from an ambisonic microphone in the same environment as the target audio source that has been steered in the direction of the target audio source. In an embodiment in which audio signals, such as from a remote user, are output from the speaker located in the same environment as the target audio source, the at least one memory and the computer program code may be further configured to, with the processor, cause the apparatus to apply echo cancellation to the target audio signal prior to producing the filtered audio signal in order to reduce the contribution from the audio signals output by the speaker to the filtered audio signal.

In a further example embodiment, a computer program product is provided that includes at least one non-transitory computer-readable storage medium having computer executable program code instructions stored therein with the computer executable program code instructions comprising program code instructions configured, upon execution, to receive a plurality of audio signals captured by a plurality of audio sensors spatially distributed throughout a space. The computer executable program code instructions also include program code instructions configured to select one or more audio signals from among the plurality of audio signals based upon one or more audio signal attributes of the plurality of audio signals, such as based upon a threshold value of the one or more audio signal attributes of the plurality of audio signals, and program code instructions configured to cause an adjustment of the one or more audio signals based upon the one or more signal attributes. The computer executable program code instructions also include program code instructions configured, following the adjustment of the one or more audio signals, to cause the one or more audio signals from among the plurality of audio signals to be mixed to form an output audio signal and program code instructions configured to cause the output audio signal to be communicated to a device of a remote user.

In an example embodiment, the program code instructions configured to cause the adjustment of the one or more audio signals based upon the one or more signal attributes comprise program code instructions configured to cause the adjustment of the one or more audio signals based upon one or more weighting values. The one or more weighting values are based upon the one or more audio signal attributes of the one or more other audio signals from among the plurality of audio signals. In an instance in which the plurality of audio signals are received during a first time period, the computer executable program code instructions of an example embodiment further comprise program code instructions configured, upon execution, to cause transmission of the one or more weighting values for the one or more audio signals to one or more of a plurality of remote processors associated with the one or more of the plurality of audio sensors such that the one or more audio signals is adjusted by or caused to be adjusted by the one or more of the plurality of remote processors according to the one or more weighting values for the one or more audio signals and program code instructions configured, upon execution, to receive, during a second time period, the adjusted one or more audio signals.

The one or more audio signal attributes of an example embodiment comprise a signal-to-noise ratio, a signal-to-interference ratio, an amplitude, a phase, a frequency, a bandwidth, a nominal level, a voltage level, or a power level. In an embodiment in which the one or more audio signal attributes comprise the signal-to-noise ratio, the one or more weighting values for the one or more audio signals is correlated to at least the signal-to-noise ratio. In an embodiment in which the one or more other audio signals not selected from among the plurality of audio signals comprise non-contributing signals and in which the plurality of audio signals are received from a plurality of remote processors, the computer executable program code instructions of an example embodiment further comprise program code instructions configured, upon execution, to cause transmission of, after a first time period, a discontinuation signal to one or more of the plurality of remote processors associated with the non-contributing signals. The discontinuation signal is indicative of a command for the one or more of the plurality of remote processors to discontinue transmitting or discontinue causing transmission of audio signals to the processor for a predetermined time.

In an example embodiment, the threshold value of the one or more audio signal attributes of the plurality of audio signals comprises a dynamic threshold value based upon one or more audio signal attribute ranges for the plurality of audio signals. In this example embodiment, the program code instructions configured to calculate the dynamic threshold value for the one or more audio signal attributes of the plurality of audio signals comprise program code instructions configured to generate the one or more audio signal attribute ranges for the one or more audio signal attributes from a minimum audio signal attribute value to a maximum audio signal attribute value for the plurality of audio signals and program code instructions configured to identify, based upon a predetermined user preference for minimizing or maximizing the one or more audio signal attributes, a lower subsection or an upper subsection, respectively, associated with the one or more audio signal ranges. the computer executable program code instructions of an example embodiment further comprise program code instructions configured, upon execution, to subdivide the space into a tessellation of cells, calculate an approximate position of an audio source within the space and calculate a distance of the audio source to a boundary between cells of the tessellation. In this example embodiment, one of the audio signal attributes of the one or more audio signals may comprise an inverse-distance of the plurality of audio sensors to the audio source within the space.

In another embodiment, an apparatus is provided for providing or causing the provision of an audio signal having enhanced quality characteristics to a device of a remote user. The apparatus can comprise means for receiving a plurality of audio signals from a plurality of audio sensors spatially distributed throughout a space. The apparatus or components thereof can be configured to, optionally, synchronize the plurality of audio signals, e.g., temporally with respect to a clock. The apparatus can comprise means for selecting one or more audio signals from among the plurality of audio signals based upon a threshold value of one or more audio signal attributes of the plurality of audio signals. In some embodiments, the one or more audio signal attributes can comprise a signal-to-noise ratio, a signal-to-interference ratio, an amplitude, a phase, a frequency, a bandwidth, a nominal level, a voltage level, or a power level. The apparatus can comprise means for adjusting or causing adjustment of the one or more audio signals based upon one or more weighting values, the one or more weighting values for the one or more audio signals being based upon the one or more audio signal attributes relative to the one or more audio signals. In some embodiments, the apparatus can comprise means for directly adjusting the one or more audio signals based upon the one or more weighting values. In some embodiments, the apparatus can comprise means for causing a separate device, such as a second at least one processor and a second at least one memory, to adjust the one or more audio signals. In some embodiments, the apparatus can comprise means for, following the adjustment of the one or more audio signals, mixing or causing the mixing of the one or more audio signals from among the plurality of audio signals to form an output audio signal. In some embodiments, the apparatus can optionally comprise means for communicating or causing communication of the output audio signal to a device of a remote user.

In some embodiments, the apparatus can comprise means for receiving the plurality of audio signals from the plurality of audio sensors, e.g., omni-directional microphones, directionally tunable microphones, or the like, during a first time period. In some embodiments, the apparatus can comprise means for transmitting or causing transmission of the one or more weighting values for the one or more audio signals to one or more of a plurality of remote processors associated with the one or more of the plurality of audio sensors such that the one or more audio signals is adjusted by the one or more of the plurality of remote processors according to the one or more weighting value for the one or more audio signals. In some embodiments, the apparatus can comprise means for receiving, during a second time period, the adjusted one or more audio signals.

In some embodiments, the threshold value of the one or more audio signal attributes of the plurality of audio signals can be a dynamic threshold value based upon the range of attribute values for the plurality of audio signals. In some embodiments, the apparatus can comprise means for calculating the dynamic threshold value for the one or more audio signal attributes of the plurality of audio signals. In some embodiments, the apparatus can comprise means for calculating the dynamic threshold value by generating an audio signal attribute value range from a minimum audio signal attribute value to a maximum audio signal attribute value for the plurality of audio signals and identifying, based upon a predetermined user preference for minimizing or maximizing the one or more audio signal attributes, a lower subsection of the range of attribute values or an upper subsection of the range of attribute values, respectively, associated with the one or more audio signals selected from the plurality of audio signals.

In some embodiments, a composite audio signal having enhanced signal attributes related to the quality of the audio source (also called a target audio source or a talker herein), can be generated at least from audio signals captured by the one or more audio sensors that have been steered in a direction of the target audio source in order to provide at least partial isolation from unwanted audio sources or ambient noise sources in the same environment as the target audio source. The filtered audio signal can be produced based on the target audio source at least from a respective one of the one or more audio sensors. The filtered audio signal can be produced so as to be based on the target audio signal that is steered in the direction of the target audio source, to deemphasize the second audio source and to reduce a contribution from audio signals output by a speaker located in the same environment as the target audio source. In some embodiments, the apparatus can comprise means for mixing or causing the mixing of the filtered audio signals to create an audio output signal associated with an audio playback format and for transmitting or causing transmission of the audio output signal to a device of a remote user in accordance with the audio playback format.

In some embodiments, the apparatus can comprise means for filtering an audio signal received from the respective audio sensors based upon the target audio source, such as by utilizing an adaptive cancellation algorithm in order to separate a contribution of the target audio source from unwanted audio sources and/or ambient noise in the same environment. The apparatus can comprise means for filtering the target audio signal based upon expected transmission characteristics of audio signals from the target audio source to the respective audio sensor. The apparatus can comprise means for generating the target audio signal by applying beamforming to audio signals received by a plurality of microphones in the same environment as the target audio source including the one or more microphones of the first device in order to steer the target audio signal in the direction of the target audio source. The apparatus can comprise means for generating the reference audio signal by receiving the target audio signal from an ambisonic microphone in the same environment as the target audio source that has been steered in the direction of the target audio source. In an embodiment in which audio signals, such as from a remote user, are output from the speaker located in the same environment as the target audio source, the apparatus can comprise means for applying echo cancellation to the target audio signal prior to producing the filtered audio signal in order to reduce the contribution from the audio signals output by the speaker to the filtered audio signal.

In another example embodiment, an apparatus can comprise at least one processor and at least one memory including computer program code, the apparatus being configured to be operably coupled to a plurality of remote processors. In some embodiments, the plurality of remote processors can be configured to receive and transmit a plurality of audio signals from a plurality of audio sensors, e.g., a plurality of remote omni-directional microphones, a plurality of remote directionally tunable microphones, or the like. In some embodiments, the at least one memory and the computer program code configured to, with the processor, cause the apparatus to receive a local audio signal having one or more audio signal attributes from a local audio sensor, e.g., a local omni-directional microphone, a local directionally tunable microphone, or the like. In some embodiments, the apparatus or components thereof can be further configured to compare the one or more audio signal attributes of the local audio signal to the one or more audio signal attributes of the plurality of audio signals from the plurality of remote processors. In some embodiments, the apparatus or components thereof can be further configured to assign a weighting value to the local audio signal, the weighting value indicative of the magnitude of the one or more audio signal attributes of the local audio signal relative to the respective one or more audio signal attributes of the plurality of audio signals received from the plurality of remote processors. In some embodiments, the apparatus or components thereof can be further configured to cause an adjustment of or adjust the local audio signal based upon the weighting value. In some embodiments, the apparatus or components thereof can be further configured to cause transmission of or transmit the adjusted local audio signal to a mixing device. In some embodiments, the apparatus or components thereof can be further configured to cause the mixing device to mix or mix the local audio signal with one or more of the plurality of audio signals from one or more of the plurality of spatially distributed processors to form a composite audio signal. In some embodiments, the one or more audio signal attributes can comprise a signal-to-noise ratio, a signal-to-interference ratio, an amplitude, a phase, a frequency, a bandwidth, a nominal level, a voltage level, or a power level. In some embodiments, the apparatus or components thereof can be configured to discontinue causing the transmission of the adjusted local audio signal if at least one of the one or more audio signal attributes fails to satisfy one or more audio signal attribute threshold values. In some embodiments, the one or more audio signal attribute thresholds can comprise dynamic signal attribute threshold values based upon a range of attribute values for the plurality of audio signals. In some embodiments, the apparatus or components thereof can be configured to calculate the dynamic threshold value for the one or more audio signal attributes by generating an audio signal attribute value range for the one or more audio signal attributes from a minimum audio signal attribute value to a maximum audio signal attribute value for the plurality of audio signals and identifying, based upon a predetermined user preference for minimizing or maximizing the one or more audio signal attributes, a lower subsection of the range of attribute values or an upper subsection of the range of attribute values, respectively, associated with the one or more audio signals selected from the plurality of audio signals.

In another example embodiment, an apparatus can comprise means for receiving, transmitting, and/or causing transmission of a plurality of audio signals from a plurality of audio sensors, e.g., a plurality of remote omni-directional microphones, a plurality of directionally tunable microphones, or the like. In some embodiments, the apparatus can comprise means for receiving, transmitting, and/or causing transmission of an audio signal having one or more audio signal attributes from a local audio sensor, e.g., a local omni-directional microphone, a local directionally tunable microphone, or the like. In some embodiments, the apparatus can comprise means for comparing the one or more audio signal attributes of the local audio signal to the one or more audio signal attributes of the plurality of audio signals from the plurality of remote processors. In some embodiments, the apparatus can comprise means for assigning a weighting value to the local audio signal, the weighting value indicative of the magnitude of the one or more audio signal attributes of the local audio signal relative to the respective one or more audio signal attributes of the plurality of audio signals received from the plurality of remote processors. In some embodiments, the apparatus can comprise means for adjusting or causing adjustment of the local audio signal based upon the weighting value. In some embodiments, the apparatus can comprise means for transmitting or causing transmission of the adjusted local audio signal to a mixing device. In some embodiments, the apparatus can comprise means for causing the mixing of or mixing the local audio signal with one or more of the plurality of audio signals from one or more of the plurality of spatially distributed processors to form a composite audio signal. In some embodiments, the one or more audio signal attributes can comprise a signal-to-noise ratio, a signal-to-interference ratio, an amplitude, a phase, a frequency, a bandwidth, a nominal level, a voltage level, or a power level. In some embodiments, the apparatus can comprise means for discontinuing transmitting or discontinuing causing the transmission of the adjusted local audio signal if at least one of the one or more audio signal attributes fails to satisfy one or more audio signal attribute threshold values. In some embodiments, the one or more audio signal attribute thresholds can comprise dynamic signal attribute threshold values based upon a range of attribute values for the plurality of audio signals. In some embodiments, the apparatus can comprise means for calculating the dynamic threshold value for the one or more audio signal attributes by generating an audio signal attribute value range for the one or more audio signal attributes from a minimum audio signal attribute value to a maximum audio signal attribute value for the plurality of audio signals and identifying, based upon a predetermined user preference for minimizing or maximizing the one or more audio signal attributes, a lower subsection of the range of attribute values or an upper subsection of the range of attribute values, respectively, associated with the one or more audio signals selected from the plurality of audio signals.

BRIEF DESCRIPTION OF THE DRAWINGS

Figure 1:
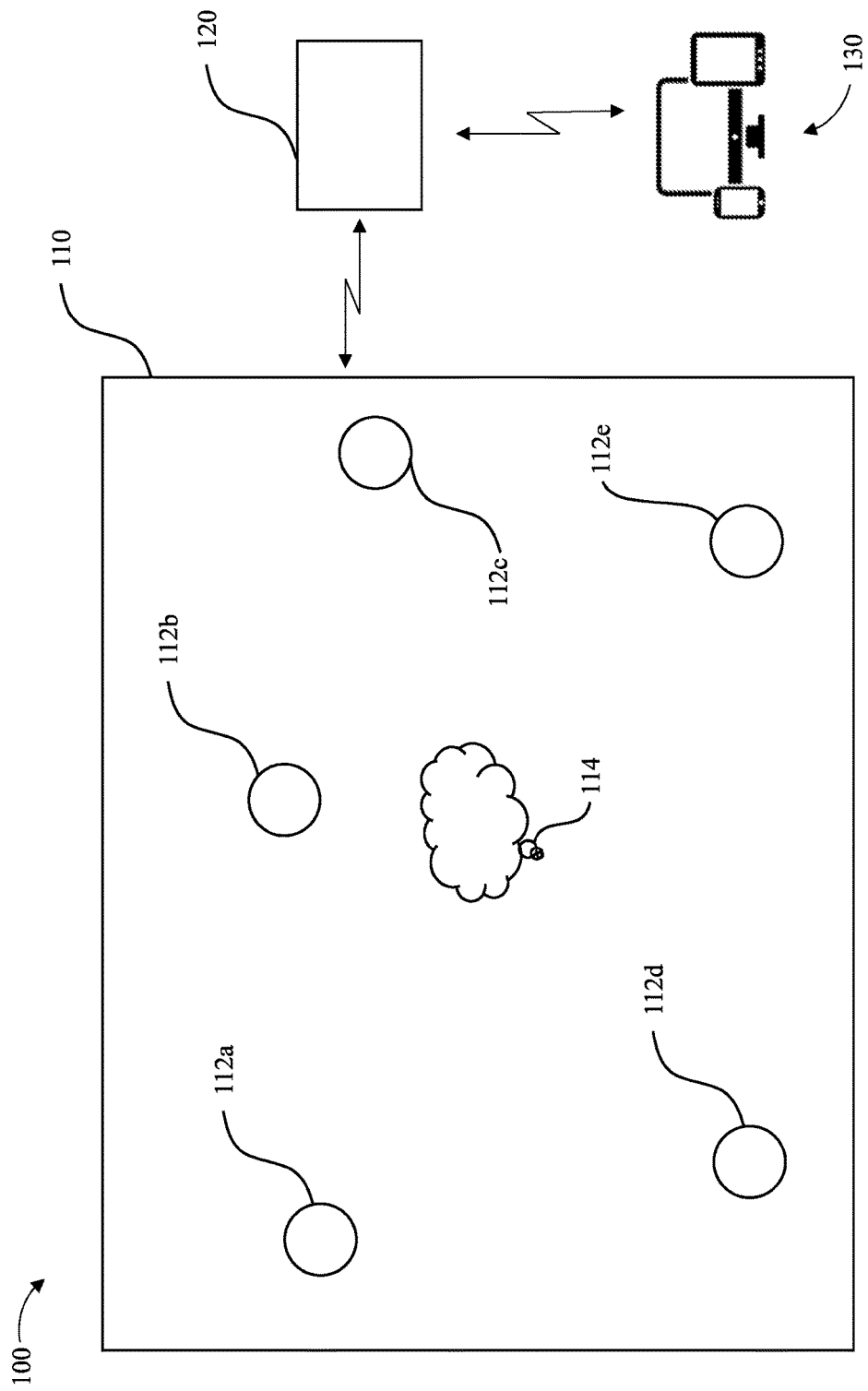
Figure 2:
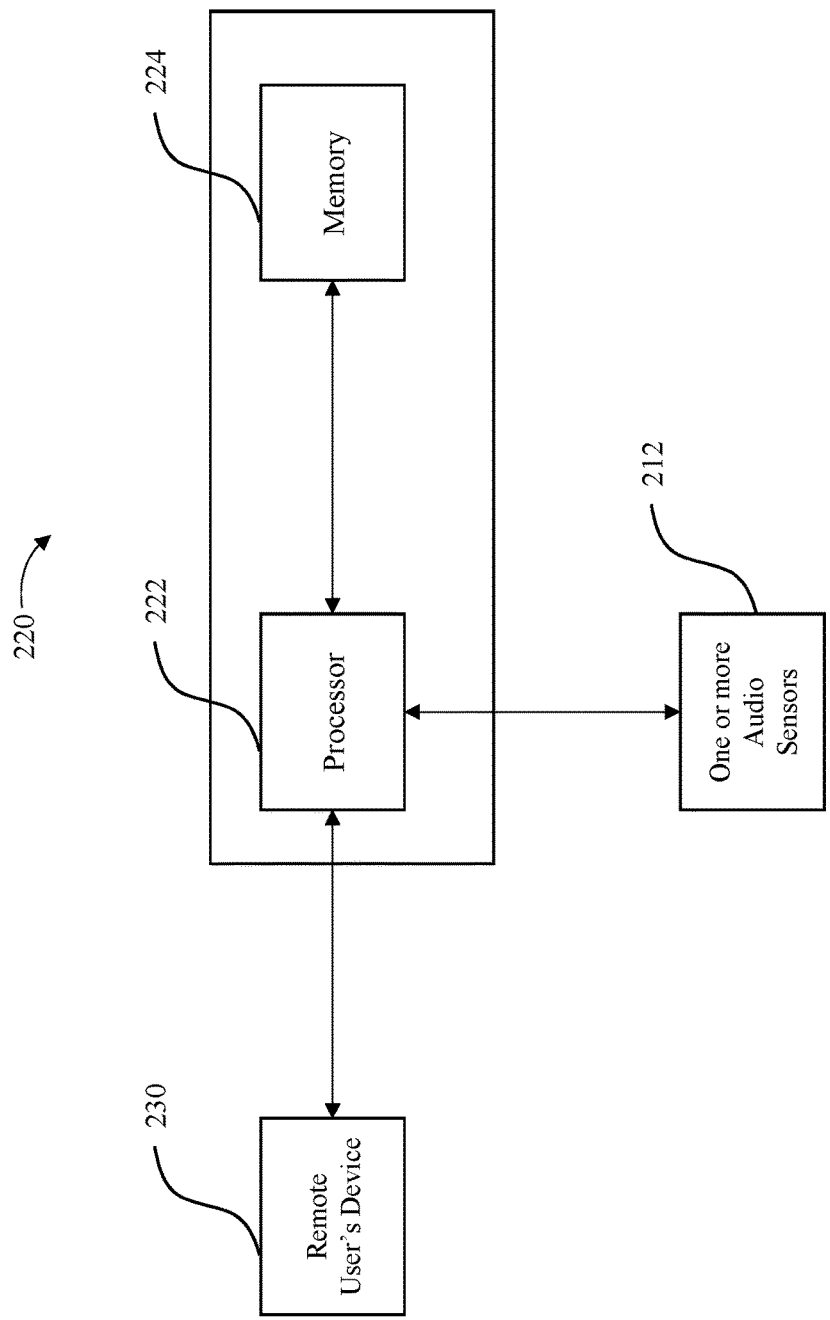
Figure 3:
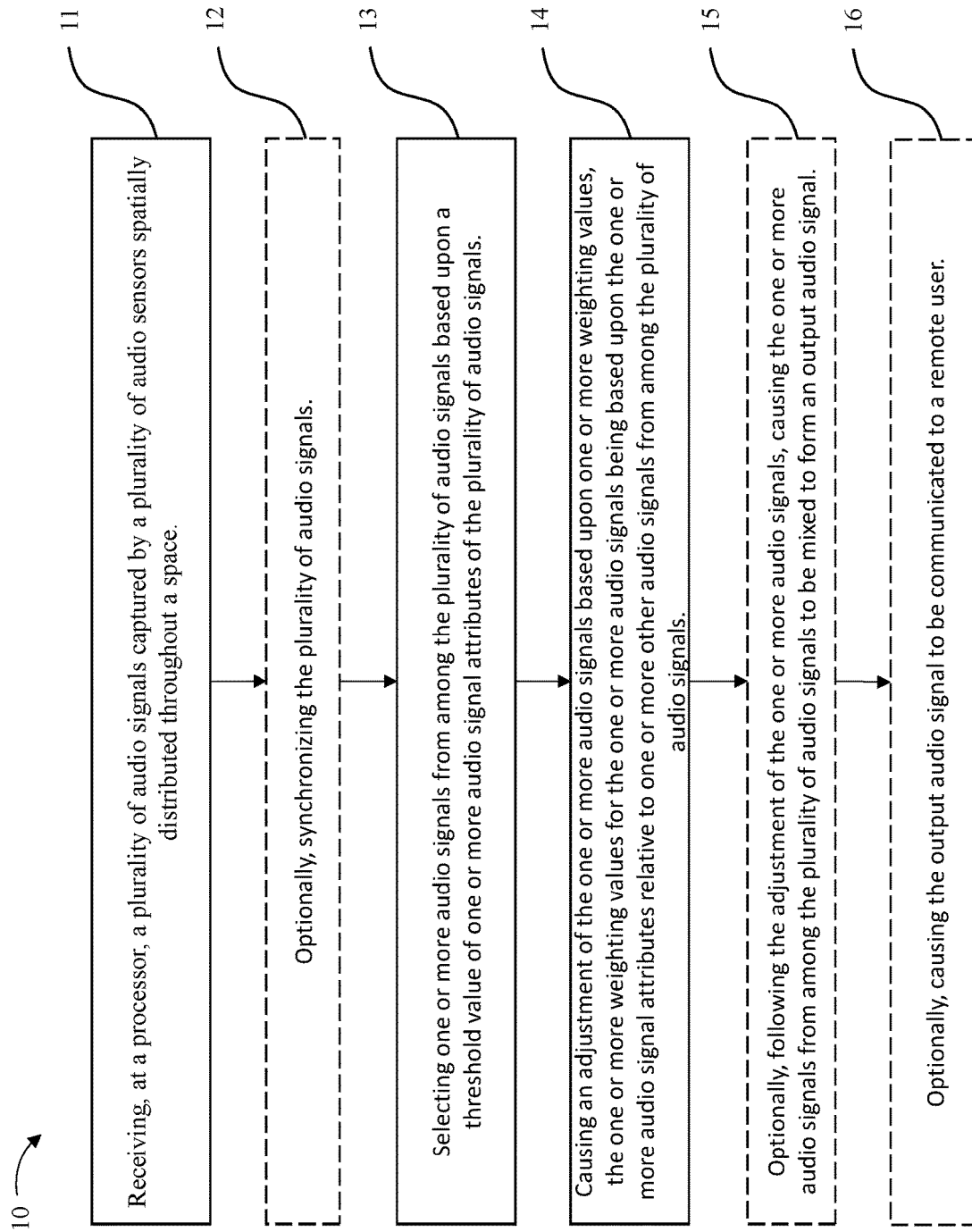
Figure 4:
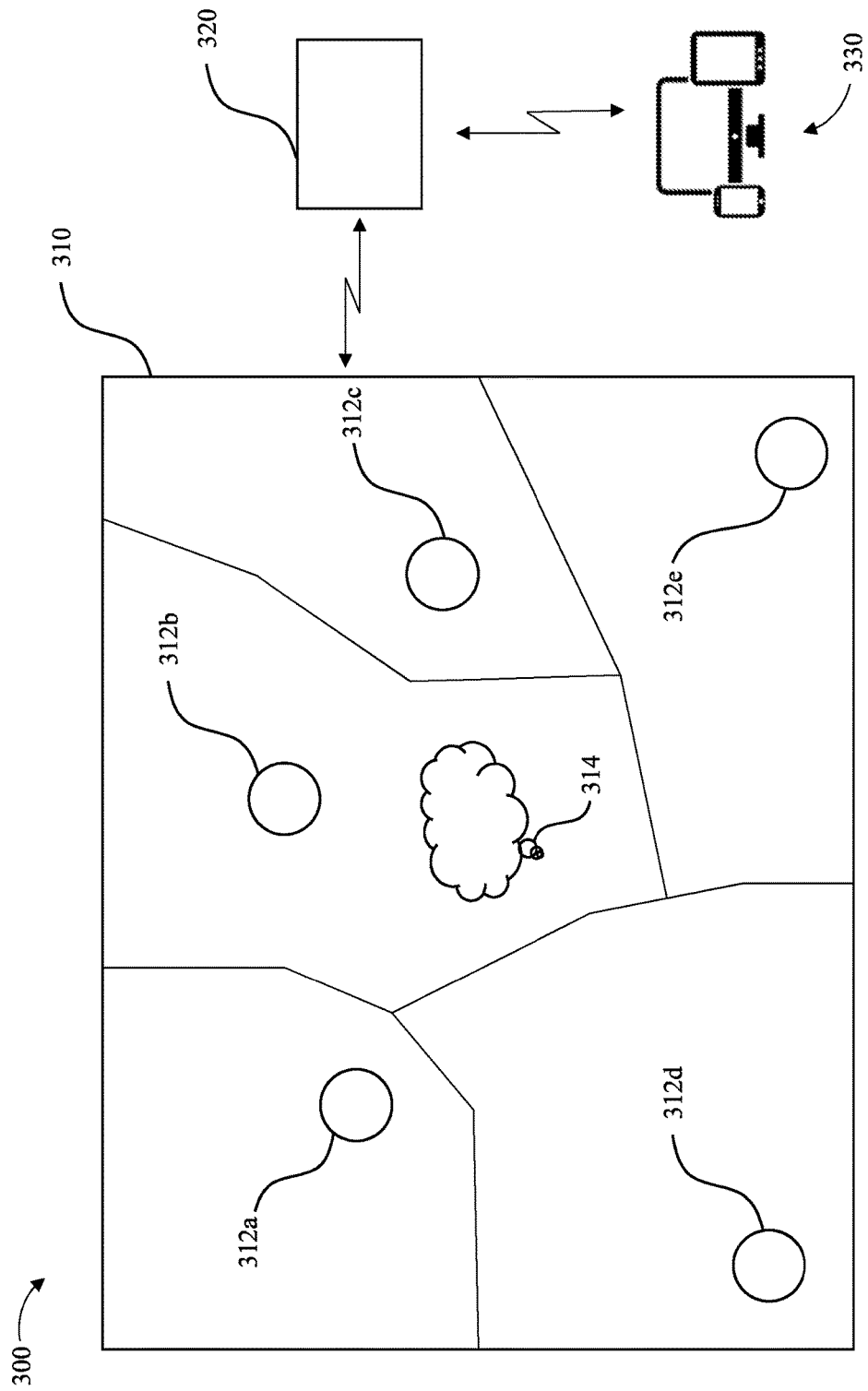
Figure 5:
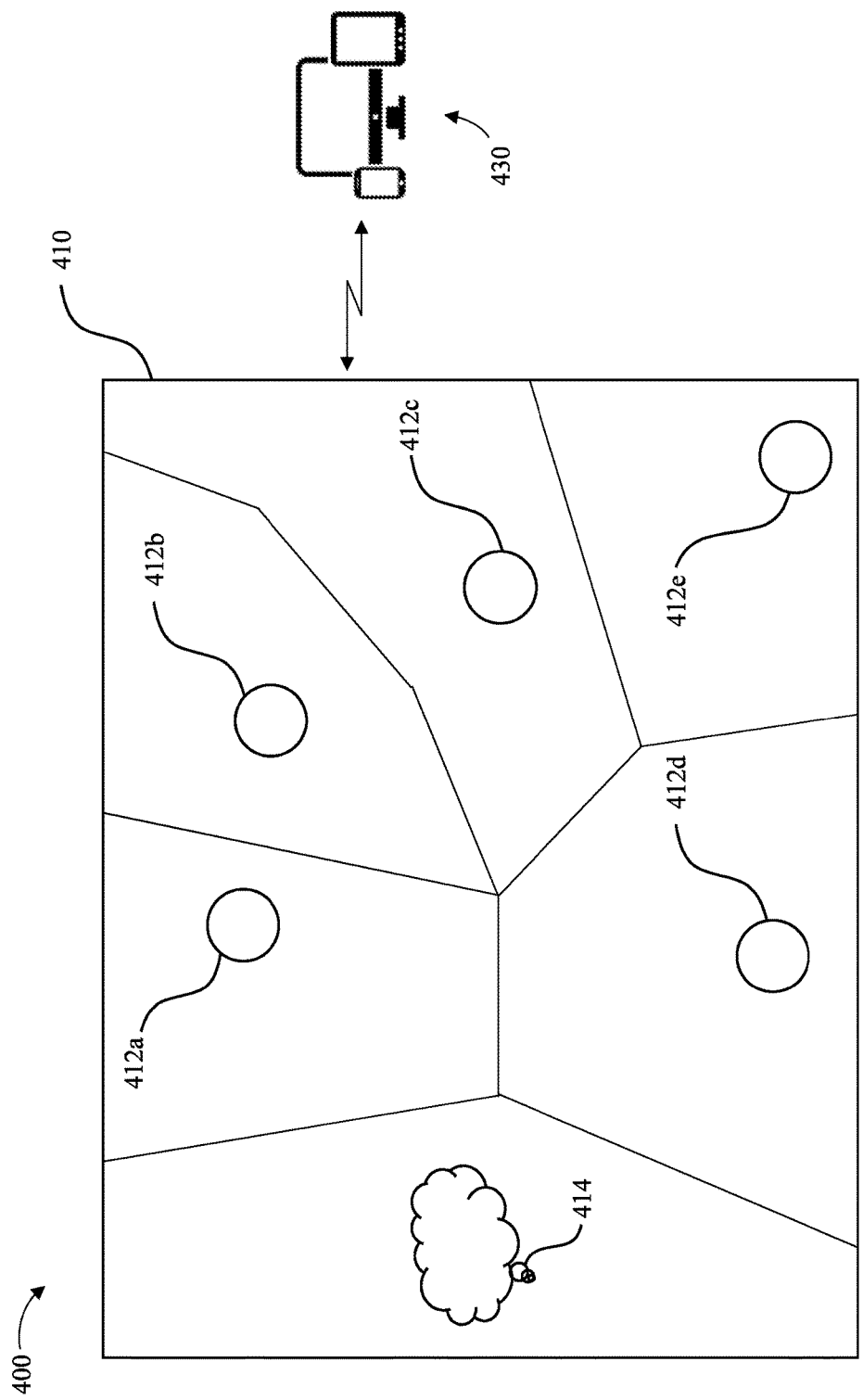

Having thus described certain example embodiments of the present disclosure in general terms, reference will hereinafter be made to the accompanying drawings, which are not necessarily drawn to scale, and wherein:

FIG. 1 is a schematic representation of a system supporting voice communication in accordance with an example embodiment of the present disclosure;

FIG. 2 is a block diagram of an apparatus that is specifically configured in accordance with an example embodiment of the present disclosure;

FIG. 3 is a flowchart illustrating operations performed, such as by the apparatus of FIG. 2, in accordance with an example embodiment of the present disclosure;

FIG. 4 is a schematic representation of a possible configuration of audio sensors distributed throughout a space with respect to an audio source and one possible tessellation formed therefore, in accordance with another example embodiment of the present disclosure; and FIG. 5 is a schematic representation of a possible configuration of audio sensors distributed throughout a space with respect to an audio source and one possible tessellation formed therefore, in accordance with another example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and a computer program product are provided for enhancing audio quality during a point-to-point communication session, e.g., a voice communication session, such as by enhancing the audio quality for a device of a remote user in a meeting. Different types of point-to-point communication may be supported including, for example, the voice communication required for remote participation in a meeting. In this regard, a meeting may be conducted in person at a first location with voice communication being provided to a second, remote location at which another participant is located and is included in the meeting, albeit remotely. In this regard, the remote user may have a mono- or bi-directional audio connection with the first location at which the meeting is conducted and, in some embodiments, a mono- or bi-directional video connection with the first location. In order to facilitate the participation and inclusion by the remote user in the meeting, the audio or the audio and visual experience for both the remote user and the participants attending the meeting in person at the first location is preferably as immersive as possible, thereby permitting greater collaboration between the meeting participants, be it within the meeting room or remotely.

One example of point-to-point communication in the form of remote participation in a meeting is depicted in FIG. 1. As shown, a system 100 for facilitating a more immersive meeting experience through enhanced audio experienced by a remote user is shown. A meeting is being conducted in a space 110 having a defined volume and predictable, related audio acoustic characteristics with regard to human speech. In this example, a plurality of audio sensors 112a-112e are distributed throughout the space 110 with respect to an audio source 114, termed herein a target audio source, a speaker, or a talker. The system further includes an apparatus 120 configured to receive one or more audio signals from one or more of the plurality of audio sensors 112a-112e associated with the audio source 114, enhance the quality of the one or more audio signals, adjust the amplitude, phase, or frequency, for instance, of the one or more audio signals, and/or mix or cause mixing of the one or more audio signals into a composite audio signal (also termed output audio signal). In addition to any participants who are attending the meeting in person, at least one other participant is included in the meeting from a remote location, known as the remote user 130, which includes, at least a remote user's device. Thus, the apparatus 120 can be further configured to transmit or cause transmission of the composite signal to a device of the remote user 130. The remote user 130 may utilize a remote listening and/or viewing device, which may be embodied by any of a variety of communication devices, in order to participate in a meeting. For example, the remote user 130 may utilize a telephone, a speakerphone or the like in order to establish audio communication with the speaker and any other participants in the space 110. Alternatively and as shown in FIG. 1, the remote user 130 may utilize a computing device, such as a laptop computer, a personal computer, a computer workstation or the like, for supporting mono- or bi-directional audio communications with the participants within the meeting, such as via a Voice Over Internet Protocol (VOIP) connection, and, in some instances also supporting a video connection with the speaker and any other participants in the space.

In the embodiment depicted in FIG. 1, the plurality of audio sensors 112a-112e can comprise a plurality of microphones as discussed hereinbelow by way of example, but not of limitation. As shown in FIG. 1, the apparatus 120 can be integrated with one or more of the audio sensors 112a-112e such that audio captured by one or more of the audio sensors can be transmitted to and received by the apparatus 120 through any suitable means, e.g., by transmission along one or more wires, using Bluetooth connection, using radio frequency or other electromagnetic energy transmissions, or the like.

In order to support point-to-point communication, e.g., voice communication, such as for a remote user in a meeting, and to enhance the immersive effect enjoyed by the remote user, the apparatus 120 may be disposed in the space 110, outside the space 110, nearby the remote user 130, or in another location in communication with one or more of the audio sensors 112a-112e and the remote user 130. In some embodiments, for example, the apparatus 120 can be located in the space 110 such that the plurality of audio sensors 112a-112e can be in local communication, according to any suitable transmission method, with the apparatus 120. In another embodiments, for example, the apparatus 120 can be located at a third location nearby neither the space 110 nor the remote user 130, the apparatus 120 being configured to be in mono- or bi-direction communication with the plurality of audio sensors 112a-112e and the remote user 130, for example via the Internet, one or more servers, a wireline connection, radio signal transmission, other electromagnetic energy transmission methods, combinations thereof, or the like. Regardless of the location of the apparatus 120, the apparatus 120 may be embodied by any of a variety of computing devices, such as a server, a personal computer, an audio processor, an audio/video system, or the like. Regardless of the manner in which the apparatus 120 is embodied, the apparatus 120 of an example embodiment includes, is associated with or otherwise is in communication with at least one processor, at least one associated memory comprising computer program code, and/or a communication interface. In some embodiments in which the apparatus 120 is embodied by a computing device associated with the remote user 130, the apparatus 130 may also itself optionally include a user interface.

In some embodiments, the apparatus 120 comprises a processor (and/or co-processors or any other circuitry assisting or otherwise associated with the processor), the processor being in communication with the memory device, e.g., via a bus, for passing information among components of the apparatus 120. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 120 to carry out various functions in accordance with an example embodiment of the present invention. For example, the memory device could be configured to buffer input data for processing by the processor. Additionally or alternatively, the memory device could be configured to store instructions for execution by the processor.

The apparatus 120 may, in some embodiments, be embodied in various computing devices as described above. However, in some embodiments, the apparatus 120 may be embodied as a chip or chip set. In other words, the apparatus 120 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 120 may therefore, in some cases, be configured to implement an embodiment of the present invention on a single chip or as a single "system on a chip." As such, in some cases, a chip or chipset may constitute means for performing one or more operations for providing the functionalities described herein.

The processor may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor may be configured to execute instructions stored in the memory device or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an audio processing system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication interface may be any means such as a device or circuitry embodied in either hardware or a combination of hardware and software that is configured to receive and/or transmit data from/to a network and/or otherwise communicate with at least one of the speaker 114, other participants in the space 110, or the remote user 130. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as embodiments in which the apparatus 120 is embodied by a computing device associated with the remote user 130, the apparatus 120 may also include a user interface that may, in turn, be in communication with the processor to receive audio and optionally video input and/or to cause presentation of audio and optionally video output. As such, the user interface may include, for example, an audio capture device, such as a microphone, and an audio output device, such as a speaker, and optionally a display device and an image capture device, such as a camera, or other input/output mechanisms. Alternatively or additionally, the processor may comprise user interface circuitry configured to control at least some functions of one or more user interface elements such as, for example, an audio capture device, and audio output device and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

In some embodiments, the apparatus 120 may include or otherwise be in communication with a display device that may, in turn, be in communication with the processor to cause presentation of the video content of the scene. As such, the display device may include, for example, a display, a touch screen, or other visual output mechanism. For example, the display device may be a helmet mounted display, a flat panel display or the like. Alternatively or additionally, the processor may comprise user interface circuitry configured to control at least some functions of the display device such as, for example, a display, and/or the like. The processor and/or user interface circuitry comprising the processor may be configured to control one or more functions of the display device through computer program instructions (e.g., software and/or firmware) stored on a memory accessible to the processor (e.g., memory device, and/or the like).

As shown in FIG. 2, the apparatus 220 comprises a processor 222 and a memory 224, the apparatus 220 configured to be in bi-directional communication with one or more audio sensors 212 and a remote user 230. Many of the elements, configurations, and characteristics of the apparatus 220 can be the same as or similar to those of the apparatus 120. Therefore, a detailed description of those similar elements, configurations, and characteristics of the apparatus 220 is not provided herein, for example, with regard to processor 222 and memory 224 characteristics, specific hardware, means for transmission of audio signals, and the like.

In some embodiments of the apparatus 220, the apparatus 220 can be configured to provide or cause provision of an audio signal having enhanced quality characteristics to a remote user. In some embodiments, the apparatus 220 can comprise at least one processor 222 and at least one memory 224 including computer program code, the at least one memory 224 being configured to, with the at least one processor 222, cause the apparatus 220, to at least receive a plurality of audio signals from one or more audio sensors 212, such as one or more audio sensors, spatially distributed throughout a space. As described herein, "spatially distributed" refers to an audio sensor array configuration wherein individual audio sensors or clusters of audio sensors in small sub-arrays are spread sparsely over a large area, as opposed to a single microphone array in some regular pattern like a typical beamformer array. The apparatus 220 or components thereof can be configured to, optionally, synchronize the plurality of audio signals, e.g., temporally with respect to a clock.

In some embodiments, the memory 224 can comprise, include, store, retrieve, be caused to retrieve, or at least partially implement computer program code such that audio signals from one or more audio sensors 212 distributed throughout the space can be manipulated, changed, augmented, removed, compressed, or otherwise altered in order to achieve a composite signal having enhanced audio signal attributes and attributable to enhanced audio quality as experienced by the remote user 230. In some embodiments, the computer program code can comprise a single application, multiple applications, a suite of interconnected applications, a single code indicative of instructions for the processor 222 to carry out a computer-implemented method, or the like.

In some embodiments, the computer program code can be used, for example by the processor 222 and the memory 224, to implement an algorithm in order to carry out a method, such as the methods described herein. In some embodiments, the algorithm can be a beamforming algorithm; a computational method for spatial filtering that enhances the relative strength of noise-source(s) at a given location, and reduces the relative strength of other noise-sources in the environment. In some embodiments, if it is desirable for a remote user 230 to listen to specific talker inside a meeting room, one or more of the audio sensors 212 could be steered to the talker location and enhance the clarity of the talker. By scanning across an area, beamformers can also identify the location of a noise-source with certain characteristics (e.g. the loudest source), and therefore find a talker inside the space. Finally, beamformers also have the additional benefit of reducing the levels of room reverberation when compared with the individual microphone signals, which can improve speech intelligibility.

In some embodiments, for example when paired with audio sensors 212, the array of distributed audio sensors 212 can be used to map the audio environmental in the space, reduce or eliminate reverberation and ambient noise, and select a subset of the microphones to be mixed together to achieve composite audio having enhanced sound quality.

In some embodiments, the apparatus 220 can be further configured to select one or more audio signals from among the plurality of audio signals based upon a threshold value of one or more audio signal attributes of the plurality of audio signals. In some embodiments, the one or more audio signal attributes can comprise a signal-to-noise ratio, a signal-to-interference ratio, an amplitude, a frequency, a bandwidth, a nominal level, a voltage level, or a power level. In some embodiments, the threshold value can be based upon attributes as simple as the amplitude of the audio signal exceeding some gate value. In some embodiments, the threshold value can comprise output from or be at least partially based upon a complex analysis of the audio signals, for instance via time-frequency analysis to detect formants associated with human speech.

The apparatus 220 or components thereof can be further configured to cause the adjustment of an amplitude of the one or more audio signals based upon one or more weighting values, the one or more weighting values for the one or more audio signals being based upon the one or more audio signal attributes relative to the one or more audio signals. In some embodiments, the apparatus 220 or components thereof can be configured to directly adjust the amplitude of the one or more audio signals based upon the one or more weighting values. In some embodiments, the apparatus of components thereof can be configured to cause a separate device, such as a second at least one processor and a second at least one memory, to adjust the amplitude of the one or more audio signals.

Amplitude weighting based on the inverse-distance of the microphones to the location of interest can be somewhat analogous to amplitude panning techniques such as VBAP and Linear Panning, which are methods for using an array of loudspeakers to place a virtual source at a point in space. Some limitations of this simple amplitude panning technique can include that it makes no allowances for the room acoustics i.e. the relative levels of sound directly radiated from the audio source of interest, discrete wall reflections and diffuse reverberation noise. These aspects of room acoustics affect the sound field and therefore the ideal weighting of microphones will change. Additionally, energy efficiency is an important concern for wireless nodes (e.g., IoT devices) with limited energy storage. It would therefore be desirable to identify and power off certain microphones whose contribution would not benefit the final audio mix.

The apparatus 220 or components thereof can optionally be further configured to, following the adjustment of the amplitude, frequency, phase, and/or other signal attributes, mix or cause the mixing of the one or more audio signals from among the plurality of audio signals to form an output audio signal. The apparatus 220 or components thereof can optionally be further configured to cause the output audio signal to be communicated to the remote user 230.

In some embodiments, the apparatus 220 or components thereof can be configured to receive the plurality of audio signals from the plurality of audio sensors 212, e.g., omnidirectional microphones, directionally tunable microphones, or the like, during a first time period. In some embodiments, the apparatus 220 can be further configured to transmit the one or more weighting values for the one or more audio signals to one or more of a plurality of remote processors (not shown) associated with the one or more of the plurality of audio sensors 212 such that the amplitude, frequency, phase, and/or other signal attributes of the one or more audio signals is adjusted by the one or more of the plurality of remote processors according to the one or more weighting value for the one or more audio signals. In other words, in some embodiments, the apparatus 220 can be used to develop the weighting values and to carry out adjustment of signal attributes such as amplitude, frequency, phase, and/or the like based on these weighting values after having received the one or more audio signals, however in some embodiments, the apparatus 220 or components thereof can transmit a signal to the remote processors indicative of a command to adjust the amplitude, frequency, phase, and/or other signal attributes of each audio signal based on respective weighting value before the audio signal is transmitted to the apparatus 220. In some embodiments, the apparatus 220 or components thereof can be configured to receive, during a second time period, the adjusted one or more audio signals.

In some embodiments, the threshold value of the one or more audio signal attributes of the plurality of audio signals can be a dynamic threshold value based upon the range of attribute values for the plurality of audio signals. In some embodiments, the apparatus 220 or components thereof can be further configured to calculate the dynamic threshold value for the one or more audio signal attributes of the plurality of audio signals. In some embodiments, the apparatus 220 or components thereof can be configured to calculate the dynamic threshold value by generating an audio signal attribute value range from a minimum audio signal attribute value to a maximum audio signal attribute value for the plurality of audio signals and identifying, based upon a predetermined user preference for minimizing or maximizing the one or more audio signal attributes, a lower subsection of the range of attribute values or an upper subsection of the range of attribute values, respectively, associated with the one or more audio signals selected from the plurality of audio signals.

In some embodiments, a composite audio signal having enhanced signal attributes related to the quality of the audio source (also called a target audio source or a talker herein), can be generated at least from audio signals captured by one or more audio sensors 212 that have been steered in a direction of the target audio source in order to provide at least partial isolation from unwanted audio sources or ambient noise sources in the same environment as the target audio source. The filtered audio signal can be produced based on the target audio source at least from a respective one of the one or more audio sensors. The filtered audio signal can be produced so as to be based on the target audio signal that is steered in the direction of the target audio source, to deemphasize the second audio source and to reduce a contribution from audio signals output by a speaker located in the same environment as the target audio source. The at least one memory 224 and the computer program code are also be configured to, with the processor 222, cause the apparatus 220 to mix the filtered audio signals to create an audio output signal associated with an audio playback format and cause the audio output signal to be output, communicated, transmitted, or otherwise delivered to a remote user in accordance with the audio playback format.

The at least one memory 224 and the computer program code are configured to, with the processor 222, cause the apparatus 220 of an example embodiment to produce the filtered audio signal and/or the composite audio signal by filtering an audio signal received from the respective audio sensors based upon the target audio source, such as by utilizing an adaptive cancellation algorithm in order to separate a contribution of the target audio source from unwanted audio sources and/or ambient noise in the same environment. The at least one memory 224 and the computer program code can be configured to, with the processor 222, cause the apparatus 220 of another example embodiment, produce the filtered audio signal by filtering the target audio signal based upon expected transmission characteristics of audio signals from the target audio source to the respective audio sensor 212. The at least one memory 224 and the computer program code can be configured to, with the processor 222, cause the apparatus 220 of an example embodiment to generate the target audio signal by applying beamforming to audio signals received by a plurality of microphones (e.g., 212) in the same environment as the target audio source including the one or more microphones in order to steer the target audio signal in the direction of the target audio source. The at least one memory 224 and the computer program code are configured to, with the processor 222, cause the apparatus 220 of another example embodiment to generate the reference audio signal by receiving the target audio signal from an ambisonic microphone in the same environment as the target audio source that has been steered in the direction of the target audio source. In an embodiment in which audio signals, such as from a remote user, are output from the speaker located in the same environment as the target audio source, the at least one memory 224 and the computer program code may be further configured to, with the processor 222, cause the apparatus 220 to apply echo cancellation to the target audio signal prior to producing the filtered audio signal in order to reduce the contribution from the audio signals output by the speaker to the filtered audio signal.

Referring now to FIG. 3, the operations performed, such as by the apparatus 220 of FIG. 2, in accordance with an example embodiment are depicted. In an example embodiment, a method 10 comprising the operations is provided for choosing a subset of a plurality of audio signals based on an audio signal attribute threshold value or range. The apparatus 220 can include means, such as the processor 222 or the like, for receiving the plurality of audio signals captured by a plurality of audio sensors spatially distributed throughout the space, at 11. The apparatus 220 can further include, optionally, means, such as the processor 222 or the like, for synchronizing or causing the synchronization of the plurality of audio signals, e.g., temporally with respect to a clock, at 12.

In some embodiments, the apparatus 220 can further include means, such as the processor 222 or the like, for selecting one or more audio signals from among the plurality of audio signals based upon a threshold value of one or more audio signal attributes of the plurality of audio signals, at 13. The apparatus 220 can further include means, such as the processor 222 or the like, for causing an adjustment of an amplitude, frequency, phase, and/or other signal attributes of the one or more audio signals based upon one or more weighting values, at 14. In some embodiments, the one or more weighting values for the one or more audio signals can be based upon the one or more audio signal attributes relative to one or more other audio signals from among the plurality of audio signals. The apparatus 220 can further include, optionally, following the adjustment of the signal attribute(s), means, such as the processor 222 or the like, for causing the one or more audio signals from among the plurality of audio signals to be mixed to form an output audio signal, at 15. The apparatus 220 can further include, optionally, means, such as the processor 222 or the like, for causing the output audio signal to be communicated to a remote user, at 16.

According to some embodiments of the method 10, receiving can be receiving, during a first time period, and the method 10 can further include transmitting or causing transmission of the one or more weighting values for the one or more audio signals to one or more of a plurality of remote processors. In some embodiments, the plurality of remote processors can be associated with the one or more of the plurality of audio sensors. In some embodiments, the amplitude, frequency, phase, and/or other signal attributes of the one or more audio signals can be adjusted by the one or more of the plurality of remote processors according to the one or more weighting values for the one or more audio signals. The method 10 can further include receiving, during a second time period, the adjusted one or more audio signals.

In some embodiments of the method 10 described herein, the one or more audio signal attributes can include, but is not limited to, a signal-to-noise ratio, a signal-to-interference ratio, an amplitude, a phase, a frequency, a bandwidth, a nominal level, a voltage level, or a power level. Therefore, the weighting values can be normalized according to, correlated with, rank ordered according to, or otherwise related to the one or more audio signal attributes, such as those described herein. For example, in some embodiments, the one or more weighting values for the one or more audio signals can be correlated to at least the signal-to-noise ratio of the one or more audio signals.

In some embodiments, one or more other audio signals not selected from among the plurality of audio signals can comprise non-contributing signals and the plurality of audio signals can be received by the processor from a plurality of remote processors. In some embodiments, the method 10 can further comprise causing transmission of, after a first time period, a discontinuation signal to one or more of the plurality of remote processors associated with the non-contributing signals, the discontinuation signal indicative of a command for the one or more of the plurality of remote processors to discontinue transmitting or discontinue causing transmission of audio signals to the processor for a predetermined time.

In some embodiments of the method 10 described herein, the threshold value of the one or more audio signal attributes of the plurality of audio signals can comprise, include, or be a dynamic threshold value based upon one or more audio signal attribute ranges for the plurality of audio signals. The dynamic threshold value or values can be calculated for the one or more audio signal attributes of the plurality of audio signals using at least one processor and at least one memory including computer program code. In some embodiments, the dynamic threshold value or values for the one or more audio signal attributes of the plurality of audio signals can be calculated by generating the one or more audio signal attribute ranges for the one or more audio signal attributes from a minimum audio signal attribute value to a maximum audio signal attribute value for the plurality of audio signals, and identifying, based upon a predetermined user preference for minimizing or maximizing the one or more audio signal attributes, a lower subsection or an upper subsection, respectively, associated with the one or more audio signal ranges.

According to some embodiments, a method 10 for enhancing the audio quality for a point-to-point communication can provide an approach for digitally steering the signals from the plurality of audio sensors distributed about a space. In some embodiments, a tessellation and cell expansion approach can be used to determine the location or approximate location of an audio source in the space. A computational method, such as a beamforming algorithm, can be employed that enhances the relative strength of noise-source(s) at a given location, and reduces the relative strength of other noise-sources in the environment. In some embodiments, if it is desirable for a remote user to listen to specific talker inside a meeting room, multiple microphones could be steered to the talker location and enhance the clarity of the talker. By scanning across an area, beamformers can also identify the location of a noise-source with certain characteristics (e.g. the loudest source), and therefore find a talker inside the room. Finally, beamformers also have the additional benefit of reducing the levels of room reverberation when compared with the individual microphone signals, which can improve speech intelligibility. In some embodiments, for example when paired with audio sensors, the array of distributed audio sensors can be used to map the audio environmental in the space, reduce or eliminate reverberation and ambient noise, and select a subset of the microphones to be mixed together to achieve composite audio having enhanced sound quality.

The method 10 of an example embodiment produces the filtered audio signal by filtering an audio signal received from the respective microphone based upon the target audio signal, such as by utilizing an adaptive cancellation algorithm in order to separate a contribution of the target audio source from the second audio source. The method 10 of another example embodiment produces the filtered audio signal by filtering the target audio signal based upon expected transmission characteristics of audio signals from the target audio source to the respective microphone. The method 10 of an example embodiment generates the target audio signal by applying beamforming to audio signals received by a plurality of microphones in the same environment as the target audio source including the one or more microphones of the second device in order to steer the target audio signal in the direction of the target audio source. The method 10 of another example embodiment generates the target audio signal by receiving the target audio signal from an ambisonic microphone in the same environment as the target audio source that has been steered in the direction of the target audio source.

In an embodiment in which audio signals, such as from a remote user, are output from the speaker located in the same environment as the target audio source, the apparatus 220 may also include means, such as the processor 222 or the like, for applying echo cancellation to the target audio signal prior to producing the filtered audio signal in order to reduce a contribution from the audio signals output by the speaker to the filtered audio signal. The apparatus 220 of an example embodiment also includes means, such as the processor 222 or the like, for estimating a location of each of a plurality of microphones located in the same environment as the target audio source including the one or more microphones of the first device by analyzing a time-of-arrival of a mechanical pressure wave captured by each of the plurality of microphones in response to a mechanical pressure wave output by a source. The apparatus 220 of another example embodiment also includes means, such as the processor 222 or the like, for estimating a location of each of a plurality of microphones located in the same environment as the target audio source including the one or more microphones of the first device by analyzing an image of the plurality of microphones. The apparatus 220 of yet another example embodiment includes means, such as the processor 222 or the like, for determining or estimating a location of each of a plurality of microphones located in the same environment as the target audio source including the one or more microphones of the first device by receiving a signal from each of the plurality of microphones indicative of the location of each of the plurality of microphones within the environment.

In some embodiments of the method 10, the apparatus, e.g., apparatus 220, can be used to affect sound propagation from the target audio source to an audio sensor. In some embodiments, an audio source-to-microphone impulse response may be represented by a filter, such as a finite impulse response (FIR) filter. In an example embodiment, an adaptive filter can be configured to estimate the FIR filter. If properly configured, the convolution of the estimated filter and reference audio signal generated by a beamformer serves to isolate the contribution of the target audio source to the audio signal captured by the microphone. By subtracting the contribution of the target audio source to the audio signal captured by the microphone from the audio signal captured by the microphone, a signal containing the remainder of the audio signal captured by the microphone is also generated which, in turn, is fed back to the adaptive filter. According to some embodiments, both the contribution of the target audio source to the audio signals captured by the microphone and the audio signals captured by the microphone from which the audio signals that originate with the target audio source have been removed can be separately generated. The contribution of the target audio source to the audio signals captured by the microphone that is generated by the adaptive filter serves as the filtered audio signal of the target audio source.

The filtered audio signal may be produced in other manners, for example, using the apparatus of another example embodiment which may include means, such as a processor or the like, for producing the filtered audio signal by filtering the target audio signal based upon expected transmission characteristics of audio signals during propagation from the target audio source to the respective microphone. In this regard, the expected transmission characteristics are based upon the distance and angle of the target audio source from the respective microphone as well as information regarding the propagation of sound through air, head-related transfer functions (HRTFs) and the interaural level and phase differences of human ears. Based upon these parameters, the expected transmission characteristics of audio signals are predicted mathematically with the resulting mathematical model then utilized in order to filter the target audio signal in accordance with the expected transmission characteristics. In comparison to embodiments in which the adaptive cancellation filter receives both the target audio signal as well as the audio signals captured by the microphones via which the remote user listens to the meeting, the filter of an alternative embodiment can receive and process the target audio signal, but not the audio signals captured by the microphones via which the remote user listens to the meeting. Thus, the target audio signal may be processed by the filter such that the resulting filtered audio signals represent the audio signals that would be heard by a virtual microphone at any position at the space.

Although the generation of the target audio signal has been described above in conjunction with the beamforming of the audio signals, the target audio signal may be generated in other manners. For example, instead of or in addition to the beamforming of the audio signals, the method or components of the apparatus, such as the processor, may be configured to emphasize the audio signals from one audio source, such as the target audio source, while deemphasizing the audio signals from one or more other potentially interfering sources in other manners. In this regard, the apparatus, such as the processor, may be configured to differently weight the audio signals from the different audio sources, such as by more greatly weighing the audio signals from one audio source, such as the target audio source, in order to emphasize those audio signals, while applying a lesser weight to the audio signals from one or more other potentially interfering sources in order to deemphasize the potentially interfering audio signals.

In some embodiments, the audio signals may be captured not only by the one or more audio sensors that capture the audio signals eventually provided to the remote user, but also by an ambisonic microphone. An ambisonic microphone employs multi-channel audio acquisition with mathematical mixing of the multi-channel output to provide for three dimensional spatial audio rendering. Thus, an ambisonic microphone generates the target audio signal that has been steered in the direction of the target audio source, thereby at least partially isolating the audio source. In some embodiments, the audio signals captured by a microphone and/or the ambisonic microphone can be processed, such as by the processor, embodying an adaptive cancellation filter, in order to produce the filtered audio signal. By repeating this process for the audio signals captured by each of the microphones and then mixing the filtered audio signals, an audio output signal may be created that may then be provided to the remote user as described above.

As also noted above, the location of each of a plurality of microphones in the space, including the one or more microphones from which the remote user receives audio signals, may be established prior to generating the reference audio signal. The location of each of the plurality of microphones may be established in various manners. For example, the location of each of the microphones may be predefined. Alternatively, the locations of the plurality of microphones may be established by interrogating the space and identifying the locations of the microphones. For example, mechanical pressure waves, such as ultrasonic (or higher frequency) signals, sound waves or the like, of a predefined frequency may be generated by each of a plurality of speakers positioned about the space. For instance, the speakers may be positioned at predefined locations throughout the space such that the ultrasonic signals, sound waves or the like emanating from the at least one of the speakers can be received by all of the plurality of audio sensors. In some embodiments, the speakers may be collocated with one or more audio sensors such that the location of the speakers need not be predefined other than by the collocated nature of the speaker and one or more microphones.

In some embodiments, each speaker can be separately caused to emit mechanical pressure waves with the other speakers providing no output until the measurements associated with the mechanical pressure waves output by one speaker have concluded. This process may then be repeated separately for each of the speakers. Alternatively, the mechanical pressure waves emitted by each of the speakers may have a different frequency. In this example embodiment, each of the speakers may be caused, such as by the apparatus and, more particularly, by the processor, to output mechanical pressure waves at a respective frequency at the same time with the resulting measurements being able to discriminate with respect to the origin of the mechanical pressure waves by the frequency thereof.

Following the generation of the mechanical pressure waves, each of the plurality of audio sensors can capture the mechanical pressure waves incident thereupon. The apparatus or a component thereof, such as the processor or the like, or other means, can identify or cause identification of the time at which the mechanical pressure waves were received by a respective microphone as well as the frequency of the mechanical pressure waves. In this regard, the time between the generation of the mechanical pressure waves and the reception of the mechanical pressure waves by a respective microphone is based upon the distance traveled by the mechanical pressure waves from the speaker to the respective microphone. According to embodiments, the sampling rate will dictate the maximum achievable spatial accuracy—for example, a sampling rate of about 44.1 kHZ can provide for a maximum achievable spatial accuracy of about 8 mm. In some embodiments, the frequency of the mechanical pressure waves may be determined in the Fourier domain following an analog-to-digital conversion or in the time domain following filtering, e.g., notch filtering.

It is likely that, initially, the mechanical pressure waves generated by various speakers will be received at slightly different times by the audio sensors due to the different distances between each of the speakers and each of the audio sensors. The magnitude of the mechanical pressure waves received by the audio sensors during this initial period may be generally the same or nearly the same as the mechanical pressure waves that have traveled directly from the speakers to the audio sensors without interaction with other surfaces. Following the initial period in which the mechanical pressure waves are received by the audio sensors after having traveled uninterrupted from the speakers, mechanical pressure waves may be received at a later point in time during a second period in which the mechanical pressure waves have reflected from a surface, such as the wall or the ceiling of the space, and then been redirected to the audio sensor. In the second period, the initial relatively large mechanical pressure wave that is received may be the reflection of the mechanical pressure wave created by the speakers associated, e.g., co-located, with the audio sensors following reflection of the mechanical pressure wave, such as from a wall in the space. The other mechanical pressure waves that are received during the second period have smaller amplitudes and may be reflected representations of the mechanical pressure waves generated by the speakers of the other remote user units following reflection from one or more surfaces throughout the space.

Based upon the timing of the receipt of the mechanical pressure waves and the relative amplitude of the mechanical pressure waves by each of the plurality of audio sensors, the apparatus, such as the processor, can be configured to estimate the location of each of the plurality of audio sensors within the space. In some embodiments, the size and shape of other features or other acoustical properties of the room that serves as the first location may also be determined based upon the mechanical pressure waves that are captured during the second period, thereby facilitating echo cancellation. By estimating the location of each of the audio sensors, the audio signals captured by the audio sensors from the target audio source may then be processed as described above in a more accurate manner including the steering of the target audio signal in the direction of the target audio source relative to the estimated location of each audio sensor.

In an instance in which the mechanical pressure waves are ultrasonic signals, the high frequencies may fall outside of the linear frequency range of a standard audio sensor. However, since only time-of-arrival accuracy is required, the location of the audio sensors may still be determined. However, if the mechanical pressure waves fall within the linear frequency range of the audio sensors, the expected attenuation of signals of each frequency in air may be predicted based upon propagation distance, such as in accordance with Stokes' Law of Attenuation. This prediction may be compared with the observed levels of attenuation to further enhance the accuracy and robust nature of the estimated locations of the audio sensors.

In instances in which the mechanical pressure waves are at frequencies outside of the audible frequency range, the mechanical pressure waves may be superimposed upon the audio signals which communicate speech between the remote user and other participants in the space. Further, in an instance in which the location of a microphone may change, the location of the audio sensors may be estimated repeatedly, such as continuously or at specific time intervals.

The location of each of the plurality of audio sensors may be estimated in other manners. For example, one or more images of the space may be captured, such as by a video camera. The images may include images of the plurality of audio sensors and/or approximate location or predicted location of the audio source, e.g., stage, podium, or the like. In some embodiments, the apparatus, such as the processor, or an image processor, either embodied by or separate from the apparatus, may analyze the images, including the various edges of the objects within the images and the angles of those edges, such as by employing an edge detection algorithm, e.g., Canny's method, Hough transforms, feature matching or other computer vision techniques, in order to estimate the location, e.g., distance to and angle of orientation, of each of the plurality of audio sensors at the first location including the one or more audio sensors from which the remote user receives the audio signals. In some embodiments, multiple techniques for estimating the locations of the audio sensors may be combined to increase the redundancy and robustness of the location determinations, such as may be desired in an instance in which the audio or video transmission path is blocked, e.g., by furniture or a person moving throughout the room.

While only certain embodiments and, therefore, equipment and system configurations have been described with regard to the method 10, it will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed lines in FIG. 3. Modifications, additions, or amplifications to the operations above may be performed in any order and in any combination.

Referring now to FIG. 4, the system 300 can include a space 310 within which an array of audio sensors 312a-312e have been spatially distributed. An audio source 314 can be positioned within the space 310 and caused to emit sound waves that at one or more of the audio sensors 312a-312e are configured to capture. Many of the elements, configurations, and characteristics of the system 300 can be the same as or similar to those of the system 100. Therefore, a detailed description of those similar elements, configurations, and characteristics of the system 300 is not provided herein, for example, with regard to the space, processor and memory characteristics, specific hardware, means for transmission of audio signals, and the like.

What follows is a detailed description of a computational approach, according to some embodiments of the method of the present invention, for capturing and mixing audio in a computationally efficient manner. Initially, the space 310 can be subdivided into individual cells. In some embodiments, a Voronoi tessellation can be used to subdivide the continuous area into cells with discrete vertices, where each cell defines the area that is closest to each vertex. An example of this tessellation is shown in FIG. 4. Once this tessellation has been performed, for example by an apparatus, e.g., apparatus 220, or components thereof, e.g., processor 222 and memory 224, the individual cells may be dilated by some amount. This dilation factor may be defined as:

$$S_A = \gamma S$$

Where S is the area of the original Voronoi tessellation, $S_A$ is the area of the dilated cell, and $\gamma$ is the dilation factor.

Once the dilated cells have been defined, the position of the audio source or location of interest to the boundaries of each dilated cell may be calculated. For each dilated cell that the location of interest falls inside, an array of weighting factors w can be formulated based on these distances:

$$w_i = \frac{d_{is}}{(d_{is} + d_{si})} \text{ where } \sum_{i=0}^{N} w_i = 1$$

where $d_{is}$ is the distance from each microphone i to the location of interest, $d_{si}$ is the distance from the location of interest to the boundary of the dilated cell, N is the number of audio sensors whose dilated cells cover the location of interest and $w_i$ is an element of the array w. The above equation defines the relative contribution of each audio sensor to the composite or output audio signal mixture and the mixing factor may be tuned based on empirical evidence. In the above example, the equation for the mixing factor is linearly dependent on the distances. There could alternatively be an exponential or other relationship between the weighting factors $w_i$ and distances $d_i$. The resulting audio mix is found by summing the product of each weighting factor by each audio sensor signal:

$$y(t) = \sum_{i=0}^{N} w_i x_i(t)$$

where $x_i(t)$ is the measured audio signal from audio sensor i. Audio sensors, e.g., microphones, that do not have dilated Voronoi cells that extend into the location of interest will have a null weighting factor and do not contribute to the composite audio signal mixture. As described below with regard to FIG. 5, non-contributing audio sensors can be switched off, reducing energy consumption.

Methods and apparatuses described herein, e.g., method 10 and apparatus 220, can be used or caused to carry out self-tuning of audio based on prior or acquired knowledge of the room acoustics of the space. In some embodiments, a room acoustic impulse response (RIR) may be estimated by emitting swept-sine waves or maximum length sequence signals from an acoustic driver, and then estimating how this sound is affected by the multipath propagation to one or multiple microphones. This impulse response contains information on how reverberant the space is, based on the reverberation time (time from the peak of the impulse to a decay in amplitude of 60 dB). Adaptive algorithms such as least mean squares (LMS) and recursive least squares (RLS) may also estimate the room impulse response between acoustic sources and receivers. In a low reverberation space, the sound field is less diffuse, meaning that audio sensors close to the source will measure a much stronger signal from the source than audio sensors positioned farther away from the audio source. In some embodiments, the dilation factor for the method outlined above may be kept low, emphasizing the contribution of audio sensors close to the audio source and allowing the power to audio sensors positioned further from the audio source to be reduced. The converse may also be true; that is, in reverberant spaces, the dilation factor can be set high so as to use a greater number of audio sensors positioned further from the audio source, which may increase the signal-to-noise ratio achieved.

According to some embodiments of the method, the room impulse response may be re-sampled at intervals in time, and the dilation factor adjusted to meet changing conditions. For example, a conference room could fill with people, reducing the reverberation time in the space. The energy use of the system would therefore be reduced since fewer audio sensors would be contributing to the composite audio signal mix.

In some embodiments, for example if a high reverberation condition is detected and more audio sensors are enabled, array processing techniques such as acoustic beamforming may be applied to the received signals, e.g., in the audio mixer. This has the benefits of dereverberation, enhances the contribution of the talker relative to other sound sources, and removes the phase offset between the audio sensor signals. This phase offset can potentially cause comb filtering as experiences in mono mixing of stereo signals, and so the fidelity of the frequency response of the system can be improved.

In some embodiments, the full procedure of dilating the cells and weighting the audio sensor signals at the mixing stage may be performed at specific frequencies or frequency bands. This may be useful as reverberation is generally higher at low frequencies where sound excites acoustic room, so the dilation factor can be frequency dependent.

The Voronoi-based weighting approach may also be applied in conjunction with a phase-shift of each audio sensor signal to account for the propagation time of sound from the source location to the audio sensor location. In some embodiments, the delay-and-sum beamformer algorithm can be used in such instances. The weighting approach may also be applied as part of other more advanced beamforming algorithms, such as Frost and Griffiths-Jim. Weighting can be used to adjust any signal attribute described herein, such as amplitude, frequency, phase, and/or other signal attributes.

Referring now to FIG. 5, the system 400 can include a space 410 within which an array of audio sensors 412a-412e have been spatially distributed. An audio source 414 can be positioned within the space 410 and caused to emit sound waves that at one or more of the audio sensors 412a-412e are configured to capture. Many of the elements, configurations, and characteristics of the system 400 can be the same as or similar to those of the system 100. Therefore, a detailed description of those similar elements, configurations, and characteristics of the system 400 is not provided herein, for example, with regard to the space, processor and memory characteristics, specific hardware, means for transmission of audio signals, and the like.

As shown in FIG. 5, especially in contrast to the embodiment depicted in FIG. 4, the system 400 can be configured and dimensioned such that the audio source 414 is or is not located within a Voronoi cell, and such that none of the audio sensors 412a-412e are thereby easily identified as a primary audio sensor. Another difference between the embodiment of FIG. 4 and the embodiment of FIG. 5, as depicted, is that the system 400 does not include an apparatus, such as the apparatus 220 or 320. In some embodiments when each audio sensor 412a-412e is associated with or comprises respective remote processor/memory pairs, such as described hereinabove, each of the audio sensors and remote processor/memory pairs can form an audio sensor node. The audio sensor nodes can operate in conjunction with or in relation to the other audio sensor nodes without the supervision of a primary system apparatus, such as the apparatus 220 or 320.

In some embodiments, audio sensor nodes 412a-412e can comprise at least one processor and at least one memory including computer program code, an audio sensor node 412a being configured to be operably coupled to a plurality of remote processors associated with other of the audio sensor node 412b-412e. In some embodiments, the plurality of remote processors can be configured to receive and transmit a plurality of audio signals from a plurality of audio sensors, e.g., a plurality of remote omni-directional microphones, a plurality of remote directionally tunable microphones, or the like. In some embodiments, the at least one memory and the computer program code configured to, with the processor, cause the audio sensor node 412a to receive, transmit, and/or cause transmission of an audio signal having one or more audio signal attributes from a local audio sensor, e.g., a local omni-directional microphone, a local directionally tunable microphone, or the like.

In some embodiments, the audio sensor node 412a or components thereof can be further configured to compare the one or more audio signal attributes of the local audio signal to the one or more audio signal attributes of the plurality of audio signals from the plurality of remote processors. In some embodiments, the audio sensor node 412a or components thereof can be further configured to assign a weighting value to the local audio signal. In some embodiments, the weighting value is indicative of the degree or magnitude of the one or more audio signal attributes of the local audio signal relative to the respective one or more audio signal attributes of the plurality of audio signals received from the plurality of remote processors. In some embodiments, the audio sensor node 412a or components thereof can be further configured to cause an adjustment of or adjust the local audio signal based upon the weighting value. For example, in some embodiments, the audio sensor node 412a or components thereof can be configured to adjust the signal amplitude, frequency, phase, and/or other signal attributes of the local audio signal based upon the weighting value. In some embodiments, the audio sensor node 412a or components thereof can be further configured to cause transmission of the adjusted local audio signal to a mixing device.

In some embodiments, the audio sensor node 412a or components thereof can be further configured to cause mixing of or to mix the local audio signal with one or more of the plurality of audio signals from one or more of the plurality of spatially distributed processors to form a composite audio signal. In some embodiments, the one or more audio signal attributes can comprise a signal-to-noise ratio, a signal-to-interference ratio, an amplitude, a phase, a frequency, a bandwidth, a nominal level, a voltage level, or a power level.

In some embodiments, the audio sensor node 412a or components thereof can be configured to discontinue transmitting or causing the transmission of the adjusted local audio signal if at least one of the one or more audio signal attributes fails to satisfy one or more audio signal attribute threshold values. In some embodiments, the one or more audio signal attribute thresholds can comprise dynamic signal attribute threshold values based upon a range of attribute values for the plurality of audio signals. In some embodiments, the audio sensor node 412a or components thereof can be configured to calculate the dynamic threshold value for the one or more audio signal attributes by generating an audio signal attribute value range for the one or more audio signal attributes from a minimum audio signal attribute value to a maximum audio signal attribute value for the plurality of audio signals and identifying, based upon a predetermined user preference for minimizing or maximizing the one or more audio signal attributes, a lower subsection of the range of attribute values or an upper subsection of the range of attribute values, respectively, associated with the one or more audio signals selected from the plurality of audio signals.

According to some embodiments, the system 400 can include such audio sensor nodes 412a-412e, wherein a first audio sensor node 412a is configured to receive sound waves from the space and the audio source 414 in particular, convert the sound waves to a first audio signal, apply a weighting factor such as described hereinabove to adjust the amplitude, frequency, phase, and/or other signal attributes of the audio signal, and transmit the adjusted audio signal for mixing purposes. In some embodiments, each of the second, third, fourth, and fifth audio nodes 412b-412e, respectively, can be caused to also carry out a similar method of receiving the audio waves, converting the audio waves to audio signals, and signal attribute adjusting according to respective weighting factors. In some embodiments, the first audio sensor node 412a can transmit the first adjusted audio signal to the second audio sensor node 412b, where the second adjusted audio signal and the first adjusted audio signal can be mixed. The mixture of the first adjusted audio signal and the second adjusted audio signal can then be transmitted to the third audio sensor node 412c and mixed with the third adjusted audio signal, and so on until a mixture of all five adjusted audio signals is formed at the fifth audio sensor node 412e. In such a way, the composite audio signal can be so serially formed and a central mixing device, such as apparatus 220 or apparatus 320 are not needed.

At least one of the advantages and improvements associated with the methods, apparatuses, computer-readable media therefore, computer code, and other embodiments described herein are related to enhanced quality of audio for the remote user. An additional advantage and improvement associated with some embodiments described herein also include that the approach is deterministic and not data-driven, meaning it only needs to be configured once or infrequently as it does not rely on analysis of the statistics of the sound signals from each microphone. An additional advantage and improvement associated with some embodiments described herein, for instance where signal attribute adjustment is simple amplitude adjustment, also include that two-way communication between audio sensors/nodes and the central processor is limited, reducing bandwidth requirements. According to some embodiments, only the value of this weighting factor must be communicated to each remote processor for each remote audio sensor in the array, which reduces transmission requirements for the central processor. According to other embodiments, the weighting value and signal attribute to be adjusted are communicated to reach remote processor for each remote audio sensor in the array. An additional advantage and improvement associated with some embodiments described herein also include that the approach is computationally simple, eliminating the need for significant computational power and capacity for each remote processor associated with each remote audio sensor in the array. An additional advantage and improvement associated with some embodiments described herein also include that the approach may be tuned to suit the acoustic parameters of the specific indoor environment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method, comprising:
   receiving, at a processor, a plurality of audio signals captured by a plurality of audio sensors distributed throughout a space, wherein the space is subdivided into a tessellation of cells, each cell comprising one or more audio sensors of the plurality of audio sensors, each audio sensor of the plurality of audio sensors being a respective distance from a sound source located inside one cell of said tessellation of cells;
   selecting one or more audio signals from among the plurality of audio signals based upon one or more audio signal attributes of the plurality of audio signals;
   causing an adjustment of the one or more audio signals based upon the one or more signal attributes;
   following the adjustment of the one or more audio signals, causing the one or more audio signals from among the plurality of audio signals to be mixed to form an output audio signal; and
   causing the output audio signal to be communicated to a device of a remote user.

2. The method of claim 1, wherein selecting the one or more audio signals from among the plurality of audio signals is based upon a threshold value of the one or more audio signal attributes of the plurality of audio signals.

3. The method of claim 1, wherein causing the adjustment of the one or more audio signals based upon the one or more signal attributes comprises causing the adjustment of the one or more audio signals based upon one or more weighting values, the one or more weighting values being based upon the one or more audio signal attributes of one or more other audio signals from among the plurality of audio signals.

4. The method of claim 1, wherein receiving further comprises receiving the plurality of audio signals during a first time period, the method further comprising:
   causing transmission of the one or more weighting values for the one or more audio signals to one or more of a plurality of remote processors associated with the one or more of the plurality of audio sensors such that the one or more audio signals is adjusted by the one or more of the plurality of remote processors according to the one or more weighting values for the one or more audio signals; and
   receiving, during a second time period, the adjusted one or more audio signals.

5. The method of claim 1, wherein the one or more audio signal attributes comprise at least one of: a signal-to-noise ratio, a signal-to-interference ratio, an amplitude, a phase, a frequency, a bandwidth, a nominal level, a voltage level, or a power level.

6. The method of claim 5, wherein the one or more audio signal attributes comprise the signal-to-noise ratio, and
   wherein the one or more weighting values for the one or more audio signals is correlated to at least the signal-to-noise ratio.

7. The method of claim 3, wherein the one or more other audio signals not selected from among the plurality of audio signals comprise non-contributing signals and wherein the plurality of audio signals are received by the processor from a plurality of remote processors, the method further comprising:
   causing transmission of, after a first time period, a discontinuation signal to one or more of the plurality of remote processors associated with the non-contributing signals, the discontinuation signal indicative of a command for the one or more of the plurality of remote processors to discontinue transmitting the one or more audio signals to the processor for a predetermined time.

8. The method of claim 2, wherein the threshold value of the one or more audio signal attributes of the plurality of audio signals comprises a dynamic threshold value based upon one or more audio signal attribute ranges for the plurality of audio signals.

9. The method of claim 8, further comprising calculating the dynamic threshold value for the one or more audio signal attributes of the plurality of audio signals by:
generating the one or more audio signal attribute ranges for the one or more audio signal attributes from a minimum audio signal attribute value to a maximum audio signal attribute value for the plurality of audio signals; and
identifying, based upon a predetermined user preference for minimizing or maximizing the one or more audio signal attributes, a lower subsection or an upper subsection, respectively, associated with the one or more audio signal ranges.

10. The method of claim 1, further comprising:
subdividing the space into the tessellation of cells, each cell of the tessellation of cells containing the one or more audio sensors of the plurality of audio sensors distributed throughout the space;
calculating an approximate position of the sound source within the space; and
calculating the respective distance between each audio sensor and the sound source.

11. The method of claim 10, wherein one of the audio signal attributes of the one or more audio signals comprises an inverse-distance of the plurality of audio sensors to the sound within the space.

12. The method of claim 1, further comprising:
calculating a position or an approximate position of the sound source within the space; and
calculating a respective distance or an approximate respective distance between each of the plurality of audio sensors and the sound source,
wherein one of the audio signal attributes of the one or more audio signals comprises an inverse-distance of the plurality of sound sensors to the audio source within the space.

13. The method of claim 12, further comprising:
assigning one or more relatively higher weighting factors to a subset of the tessellation of cells that are closer to the sound source within the space; and
assigning one or more relatively lower weighting factors to a subset of the tessellation of cells that are further from the sound source within the space.

14. The method of claim 13, further comprising:
following the adjustment of the one or more audio signals, causing the one or more audio signals from among the plurality of audio signals to be mixed, based at least upon the one or more relatively higher weighting factors and the one or more lower weighting factors, to form the output audio signal.

15. The method of claim 1, further comprising:
calculating the respective distance between each audio sensor and an interface between one or more adjacent cells of the tessellation of cells.

16. The method of claim 15, further comprising:
determining a subset of cells of the tessellation of cells that are within a predetermined distance of a cell comprising the sound source;
determining, for each cell of the subset of the tessellation of cells, a respective distance between the one or more respective audio sensors and a closest interface between the cell and one or more adjacent cells in a direction of the sound source;
assigning a weighting factor to each of the subset of cells based at least upon the distance between the one or more respective audio sensors and the closest interface between the cell and the one or more adjacent cells in the direction of the sound source; and
causing the one or more audio signals from among the plurality of audio signals to be mixed, based at least upon the weighting factors of the subset of cells, to form the output audio signal.

17. An apparatus comprising at least one processor and at least one memory including computer program code, the at least one memory and the computer program code configured to, with the processor, cause the apparatus to at least:
receive a plurality of audio signals from a plurality of audio sensors distributed throughout a space, wherein the space is subdivided into a tessellation of cells, each cell comprising one or more audio sensors of the plurality of audio sensors, each audio sensor of the plurality of audio sensors being a respective distance from a sound source located inside one cell of said tessellation of cells;
select one or more audio signals from among the plurality of audio signals based upon one or more audio signal attributes of the plurality of audio signals;
cause the adjustment of the one or more audio signals based upon the one or more signal attributes;
following the adjustment of the one or more audio signals, cause the mixing of the one or more audio signals from among the plurality of audio signals to form an output audio signal; and
cause the output audio signal to be communicated to a device of a remote user.

18. The apparatus of claim 17, wherein selecting the one or more audio signals from among the plurality of audio signals is based upon a threshold value of the one or more audio signal attributes of the plurality of audio signals.

19. The apparatus of claim 17, wherein causing the adjustment of the one or more audio signals based upon the one or more signal attributes comprises causing the adjustment of the one or more audio signals based upon one or more weighting values, the one or more weighting values being based upon the one or more audio signal attributes of one or more other audio signals from among the plurality of audio signals.

20. The apparatus of claim 17, wherein the at least one memory and the computer program code are configured to, with the processor, cause the apparatus to:
receive the plurality of audio signals from the plurality of audio sensors during a first time period, and wherein the at least one memory and the computer program code are configured to, with the processor, cause the apparatus at least to:
cause transmission of the one or more weighting values for the one or more audio signals to one or more of a plurality of remote processors associated with the one or more of the plurality of audio sensors such that the one or more audio signals is adjusted by the one or more of the plurality of remote processors according to the one or more weighting value for the one or more audio signals; and
receive, during a second time period, the adjusted one or more audio signals.

21. The apparatus of claim 17, wherein the one or more audio signal attributes comprise at least one of: a signal-to-noise ratio, a signal-to-interference ratio, an amplitude, a phase, a frequency, a bandwidth, a nominal level, a voltage level, or a power level.

22. The apparatus of claim 18, wherein the threshold value of the one or more audio signal attributes of the plurality of audio signals is a dynamic threshold value based upon the range of attribute values for the plurality of audio signals.

23. The apparatus of claim 22, wherein the processor is further configured to calculate the dynamic threshold value for the one or more audio signal attributes of the plurality of audio signals by:
- generating an audio signal attribute value range from a minimum audio signal attribute value to a maximum audio signal attribute value for the plurality of audio signals; and
- identifying, based upon a predetermined user preference for minimizing or maximizing the one or more audio signal attributes, a lower subsection of the range of attribute values or an upper subsection of the range of attribute values, respectively, associated with the one or more audio signals selected from the plurality of audio signals.

24. An apparatus comprising:
- at least one processor configured to be operably coupled to a plurality of remote processors, the plurality of remote processors configured to receive and transmit a plurality of audio signals from a plurality of remote audio sensors distributed throughout a space, wherein the space is subdivided into a tessellation of cells, each cell comprising one or more audio sensors of the plurality of audio sensors, each audio sensor of the plurality of audio sensors being a respective distance from a sound source located inside one cell of said tessellation of cells; and
- at least one memory including computer program code, the at least one memory and the computer program code configured to, with the processor, cause the apparatus to at least:
  - receive, from a remote processor of the plurality of remote processors, a local audio signal captured by a local audio sensor and having one or more audio signal attributes;
  - cause an adjustment of the local audio signal based upon a comparison of the one or more audio signal attributes of the local audio signal to one or more audio signal attributes of the plurality of audio signals from the plurality of remote processors; and
  - cause transmission of the adjusted local audio signal to a mixing device.

25. The apparatus of claim 24, wherein causing the adjustment of the local audio signal based upon comparison of the one or more signal attributes of the local audio signal to the one or more audio signal attributes of the plurality of audio signals from the plurality of remote processors comprises causing the adjustment of the local audio signal based upon one or more weighting values, the one or more weighting values being based upon the one or more audio signal attributes of the local audio signal compared to the one or more audio signal attributes of the plurality of audio signals from the plurality of remote processors.

26. The apparatus of claim 24, wherein the at least one memory and the computer program code are further configured to, with the processor, cause the apparatus to at least:
- cause the mixing device to mix the local audio signal with one or more of the plurality of audio signals from one or more of the plurality of distributed processors to form a composite audio signal.

27. The apparatus of claim 24, wherein the one or more audio signal attributes comprises at least one from among a signal-to-noise ratio, a signal-to-interference ratio, an amplitude, a phase, a frequency, a bandwidth, a nominal level, a voltage level, or a power level.

28. The apparatus of claim 24, wherein the processor is configured discontinue causing the transmission of the adjusted local audio signal if at least one of the one or more audio signal attributes fails to satisfy one or more audio signal attribute threshold values.

29. The apparatus of claim 28, wherein the one or more audio signal attribute thresholds comprise dynamic signal attribute threshold values based upon a range of attribute values for the plurality of audio signals.

30. The apparatus of claim 29, wherein the processor is configured to calculate, using the computer-implemented method and the memory, the dynamic threshold value for the one or more audio signal attributes by:
- generating an audio signal attribute value range for the one or more audio signal attributes from a minimum audio signal attribute value to a maximum audio signal attribute value for the plurality of audio signals; and
- identifying, based upon a predetermined user preference for minimizing or maximizing the one or more audio signal attributes, a lower subsection of the range of attribute values or an upper subsection of the range of attribute values, respectively, associated with the one or more audio signals selected from the plurality of audio signals.

* * * * *